US011861972B2

(12) United States Patent
Yost et al.

(10) Patent No.: US 11,861,972 B2
(45) **Date of Patent: *Jan. 2, 2024**

(54) GAMING MACHINE AND METHOD OF OPERATING GAMING MACHINE

(71) Applicant: Konami Gaming, Inc., Las Vegas, NV (US)

(72) Inventors: Kimberly Yost, Las Vegas, NV (US); John Pariseau, Las Vegas, NV (US)

(73) Assignee: KONAMI GAMING, INC., Les Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,907

(22) Filed: Jan. 19, 2022

(65) Prior Publication Data

US 2022/0284760 A1 Sep. 8, 2022

Related U.S. Application Data

(63) Continuation of application No. 16/601,416, filed on Oct. 14, 2019, now Pat. No. 11,263,863.

(51) Int. Cl.
*G07F 17/32* (2006.01)
*G07F 17/34* (2006.01)

(52) U.S. Cl.
CPC ...... *G07F 17/3213* (2013.01); *G07F 17/3258* (2013.01); *G07F 17/3267* (2013.01); *G07F 17/34* (2013.01)

(58) Field of Classification Search
CPC ............. G07F 17/3213; G07F 17/3258; G07F 17/3267; G07F 17/34
See application file for complete search history.

(56) References Cited

U.S. PATENT DOCUMENTS 9,311,787 B2 * 4/2016 Meyer ................. G07F 17/3211
11,263,863 B2 * 3/2022 Yost .................... G07F 17/3258
2003/0153381 A1 * 8/2003 Slattery ............... G07F 17/3227 463/16
2005/0070353 A1 * 3/2005 Webb ...................... G07F 17/34 463/16
2006/0111174 A1 * 5/2006 Baerlocher ............. G07F 17/34 463/20

(Continued)

*Primary Examiner* — Dmitry Suhol
*Assistant Examiner* — Carl V Larsen
(74) *Attorney, Agent, or Firm* — Howard & Howard Attorneys PLLC

(57) ABSTRACT

A gaming machine is described herein. The gaming machine includes a game control unit programmed to display a game screen on the display unit and initiate an instance of the game. The game screen includes a grid including a plurality of cells arranged in a plurality of columns. Each column is associated with a corresponding symbol and includes a predefined number of cells. The game control unit initiates an instance of the game by populating a subset of cells within each column with a plurality of awards, randomly determining, for each corresponding column, a number of corresponding symbols to be displayed in a stack of corresponding symbols, and displaying each stack of corresponding symbols within each corresponding column. The game control unit then determines each cell of the subset of cells being displayed with a corresponding symbol and a corresponding award, and provides each corresponding award to the player.

20 Claims, 37 Drawing Sheets

(56) References Cited

U.S. PATENT DOCUMENTS

| | | | | |
|---|---|---|---|---|
| 2007/0149276 | A1* | 6/2007 | Iwamoto | G07F 17/3244<br>463/20 |
| 2010/0075741 | A1* | 3/2010 | Aoki | G07F 17/3202<br>463/20 |
| 2013/0237306 | A1* | 9/2013 | Meyer | G07F 17/34<br>463/20 |
| 2017/0053496 | A1* | 2/2017 | Borissov | G07F 17/3267 |
| 2017/0092049 | A1* | 3/2017 | Bolling, Jr. | G07F 17/3244 |
| 2017/0372558 | A1* | 12/2017 | You | G07F 17/3267 |
| 2018/0268657 | A1* | 9/2018 | Kroon | G07F 17/3262 |
| 2019/0295376 | A1* | 9/2019 | Ludwick | G07F 17/3211 |

* cited by examiner 150
98
86 (PIC-A – PIC-E)
138 (BONUS FEATURE A – C)
| GAME SYMBOL | IMAGE FILE | IMAGE |
|---|---|---|
| PIC-A | [TIKI 1] | 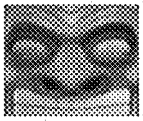 |
| PIC-B | [TIKI 2] | 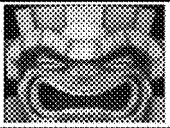 |
| PIC-C | [TIKI 3] | 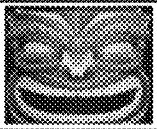 |
| PIC-D | [TIKI 4] | 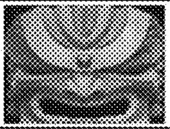 |
| PIC-E | [TIKI 5] | 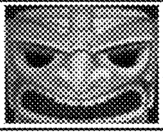 |
| BONUS FEATURE A | [TIKI DROP] | 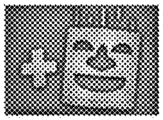 |
| BONUS FEATURE B | [TIKI RISE] | 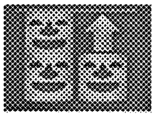 |
| BONUS FEATURE C | [TIKI COMBO] | 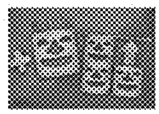 |
FIG. 15

140

| PRIZE WHEEL LOGIC TABLE | | | | |
|---|---|---|---|---|
| | WAGER AMOUNT, CREDITS | | | |
| | 50 | 100 | 150 | 200 |
| PRIZE WHEEL 1 | ACTIVE | ACTIVE | ACTIVE | ACTIVE |
| PRIZE WHEEL 2 | ACTIVE | ACTIVE | ACTIVE | ACTIVE |
| PRIZE WHEEL 3 | INACTIVE | ACTIVE | ACTIVE | ACTIVE |
| PRIZE WHEEL 4 | INACTIVE | INACTIVE | ACTIVE | ACTIVE |
| PRIZE WHEEL 5 | INACTIVE | INACTIVE | INACTIVE | ACTIVE |

142

FIG. 16

156

| PRIZE WHEEL AWARD LOGIC TABLE | | | | | | |
|---|---|---|---|---|---|---|
| PRIZE WHEEL 1 | 500 | 500 | 1000 | 1000 | 1000 | 1250 |
| PRIZE WHEEL 2 | MINI | 1000 | 1000 | 1250 | 1250 | 1500 |
| PRIZE WHEEL 3 | MINI | 1000 | 1250 | MAJOR | 1250 | 1500 |
| PRIZE WHEEL 4 | MINI | 1250 | MAJOR | 1500 | MEGA | 1500 |
| PRIZE WHEEL 5 | MINI | 1500 | MAJOR | MEGA | 2000 | MAXI |

FIG. 17

144

| AWARD SELECTION WEIGHT TABLE | |
|---|---|
| CREDIT AWARD | WEIGHT |
| 40 | 3.48% |
| 50 | 17.42% |
| 75 | 45.28% |
| 100 | 31.34% |
| 200 | 2.47% |

FIG. 18

148

| GAME SYMBOL SELECTION WEIGHT TABLE | | | | | |
|---|---|---|---|---|---|
| No. of Symbols | Column 1 | Column 2 | Column 3 | Column 4 | Column 5 |
| 0 | 0 | 0 | 0 | 0 | 0 |
| 1 | 500 (3.48%) | 100 (12.25%) | 40 (3.49%) | 200 (20.79%) | 25 (27.84%) |
| 2 | 2500 (17.42%) | 200 (24.51%) | 200 (17.44%) | 750 (77.96%) | 60 (68.97%) |
| 3 | 6500 (45.28%) | 500 (61.27%) | 200 (17.44%) | 12 (1.25%) | 2 (2.30%) |
| 4 | 4499 (31.34%) | 16 (1.96%) | 288 (25.11%) | 0 | 0 |
| 5 | 355 (2.47%) | 0 | 400 (34.87%) | 0 | 0 |
| Total | 14354 (100%) | 816 (100%) | 1128 (100%) | 204 (100%) | 87 (100%) |

FIG. 19

146

| MULTIPLIER SELECTION WEIGHT TABLE | | |
|---|---|---|
| | 2x Multiplier | 3x Multiplier |
| Column 1 | 80% | 20% |
| Column 2 | 80% | 20% |
| Column 3 | 20% | 80% |
| Column 4 | 85% | 15% |
| Column 5 | 90% | 10% |

FIG. 20

136

| BONUS FEATURE REEL STRIP | |
|---|---|
| Stop Position | Bonus Feature Symbol |
| 1 | Bonus Feature A |
| 2 | Bonus Feature A |
| 3 | Bonus Feature B |
| 4 | Bonus Feature B |
| 5 | Bonus Feature B |
| ⋮ | ⋮ |
| *N* | Bonus Feature C |

FIG. 21

154

| ADDITIONAL SYMBOL SELECTION WEIGHT TABLE | | | | | |
|---|---|---|---|---|---|
| No. of Symbols | Column 1 | Column 2 | Column 3 | Column 4 | Column 5 |
| 0 | 50% | 20% | 20% | 30% | 20% |
| 1 | 40% | 500% | 70% | 50% | 50% |
| 2 | 10% | 30% | 10% | 20% | 30% |

FIG. 22

FIG. 23A
FIG. 23B
FIG. 23C
FIG. 23D
68
$10,758.54
MAXI
$141.08
$52.19
$14.88
TREASURE LOUNGE
MAJOR
MEGA
ALL
27693
0
200
$10,758.54
MAXI
$141.08
$52.20
$14.88
TREASURE LOUNGE
MAJOR
MEGA
ALL
27693
0
200
$10,758.54
MAXI
$141.08
$52.20
$14.88
TREASURE LOUNGE
MAJOR
MEGA
ALL
27693
0
200
$10,758.54
MAXI
$141.08
$52.20
$14.88
TREASURE LOUNGE
MAJOR
MEGA
ALL
27693
0
200

FIG. 25
68
134
$10,758.69
MAXI
$141.38
MEGA
$52.65
MAJOR
$15.48
MINI
TREASURE LOUNGE
MAJOR
MEGA
ALL
JACKPOTS
HELP YOU REACH
WHEELS!
24463
0
200
1¢

FIG. 26A
FIG. 26B
FIG. 26C
FIG. 26D
$10,758.71
MAXI
$141.42
$52.70
$15.56
TREASURE LOUNGE
MAJOR
MEGA
ALL
24958
200
$10,758.71
MAXI
$141.42
$52.70
$15.56
TREASURE LOUNGE
MAJOR
MEGA
ALL
24958
200
$10,758.71
MAXI
$141.42
$52.70
$15.56
TREASURE LOUNGE
MAJOR
MEGA
ALL
24958
200
$10,758.71
MAXI
$141.42
$52.70
$15.56
TREASURE LOUNGE
MAJOR
MEGA
ALL
24958
200

FIG. 27A
FIG. 27B
FIG. 27C
FIG. 27D
72
$10,758.69
MAXI
$141.38
$52.65
$15.48
TREASURE LOUNGE
MAJOR
MEGA
ALL
24463
0
200
$10,758.69
MAXI
$141.38
$52.65
$15.48
TREASURE LOUNGE
MAJOR
MEGA
ALL
24463
0
200
$10,758.69
MAXI
$141.38
$52.65
$15.48
TREASURE LOUNGE
MAJOR
MEGA
ALL
24463
0
200
$10,758.69
MAXI
$141.38
$52.65
$15.48
TREASURE LOUNGE
MAJOR
MEGA
ALL
24463
0
200

| UniSymbol Reel Strips | | | | | |
|---|---|---|---|---|---|
| Stop Position | Pic-A Reel | Pic-B Reel | Pic-C Reel | Pic-D Reel | Pic-E Reel |
| 1 | **PIC-A** | BLANK | **PIC-C** | **PIC-D** | BLANK |
| 2 | BLANK | **PIC-B** | **PIC-C** | **PIC-D** | **PIC-E** |
| 3 | **PIC-A** | **PIC-B** | BLANK | **PIC-D** | **PIC-E** |
| 4 | BLANK | BLANK | **PIC-C** | BLANK | BLANK |
| 5 | BLANK | **PIC-B** | BLANK | BLANK | **PIC-E** |
| 6 | **PIC-A** | **PIC-B** | BLANK | BLANK | BLANK |
| ⋮ | ⋮ | ⋮ | ⋮ | ⋮ | ⋮ |
| *N* | BLANK | BLANK | **PIC-C** | BLANK | **PIC-E** |

164 166 162 86 160 160

FIG. 32

152

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 33

GAMING MACHINE AND METHOD OF OPERATING GAMING MACHINE

CROSS REFERENCE TO RELATED APPLICATION

This application is a continuation of U.S. patent application Ser. No. 16/601,416, filed Oct. 14, 2019, the disclosure of which is hereby incorporated by reference in its entirety.

TECHNICAL FIELD

The present invention relates to a gaming machine and a method of operating a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine to reduce the overall cost and manpower required to develop and maintain existing gaming machines.

The present invention addresses one or more of the aforementioned challenges.

SUMMARY OF INVENTION

In one aspect of the present invention, a gaming machine is provided. The gaming machine includes a display unit, a memory device, and a game control unit for executing a game. The display unit is configured to display game screens including computer-generated images. The memory device stores a game execution program including a computer-implemented algorithm for generating a game using computer-generated images. The game control unit includes a processor programmed to execute the game execution program to display a game screen on the display unit and initiate an instance of the game. The game screen includes a grid including a plurality of cells arranged in a plurality of columns. Each column is associated with a corresponding symbol and includes a predefined number of cells. The processor initiates an instance of the game by populating a subset of cells within each column with a plurality of awards, randomly determining, for each corresponding column, a number of corresponding symbols to be displayed in a stack of corresponding symbols, and displaying each stack of corresponding symbols within each corresponding column. The processor then determines each cell of the subset of cells being displayed with a corresponding symbol and a corresponding award, and provides each corresponding award to the player.

In another aspect of the present invention, one or more non-transitory computer-readable storage media, having computer-executable instructions embodied thereon is provided. When executed by a processor, the computer-executable instructions cause the processor to display a game screen on a display unit and initiate an instance of the game. The game screen includes a grid including a plurality of cells arranged in a plurality of columns. Each column is associated with a corresponding symbol and includes a predefined number of cells. The processor initiates an instance of the game by populating a subset of cells within each column with a plurality of awards, randomly determining, for each corresponding column, a number of corresponding symbols to be displayed in a stack of corresponding symbols, and displaying each stack of corresponding symbols within each corresponding column. The processor determines each cell of the subset of cells being displayed with a corresponding symbol and a corresponding award, and provides each corresponding award to the player.

In still another aspect of the present invention, a mobile computing device is provided. The mobile computing device includes a touch display unit, a memory device, and a processor. The touch display unit is configured to display game screens including computer generated images. The memory device stores a game execution program including a computer-implemented algorithm for generating a game using computer-generated images. The a processor executes the game execution program to display a game screen on the display unit and initiate an instance of the game. The game screen includes a grid including a plurality of cells arranged in a plurality of columns. Each column is associated with a corresponding symbol and includes a predefined number of cells. The processor initiates an instance of the game by populating a subset of cells within each column with a plurality of awards, randomly determining, for each corresponding column, a number of corresponding symbols to be displayed in a stack of corresponding symbols, and displaying each stack of corresponding symbols within each corresponding column. The processor determines each cell of the subset of cells being displayed with a corresponding symbol and a corresponding award and provides each corresponding award to the player.

BRIEF DESCRIPTION OF DRAWINGS

FIG. 15 is an illustration of a symbol image data file that may be used to execute the game shown in FIGS. 3A-3C, according to an embodiment of the present invention.

FIGS. 16-22 are illustrations of exemplary data files that may be used to execute the game shown in FIGS. 3A-3C, according to embodiments of the present invention.

FIGS. 23A-28B are illustrations of sequences of graphic images that may be used to display the game shown in FIGS. 3A-3C on the display area of the gaming machine and/or the mobile computer device, according to embodiments of the present invention.

FIG. 32 is an illustration of exemplary reel strip data file for use in generating virtual reels shown in FIGS. 30-31C, according to an embodiment of the present invention.

FIG. 33 is an illustration of a reel stop position data file that may be used to execute the game shown in FIGS. 30-31C, according to an embodiment of the present invention.

Corresponding reference characters indicate corresponding parts throughout the drawings.

DETAILED DESCRIPTION OF EMBODIMENTS

Figure 1A:
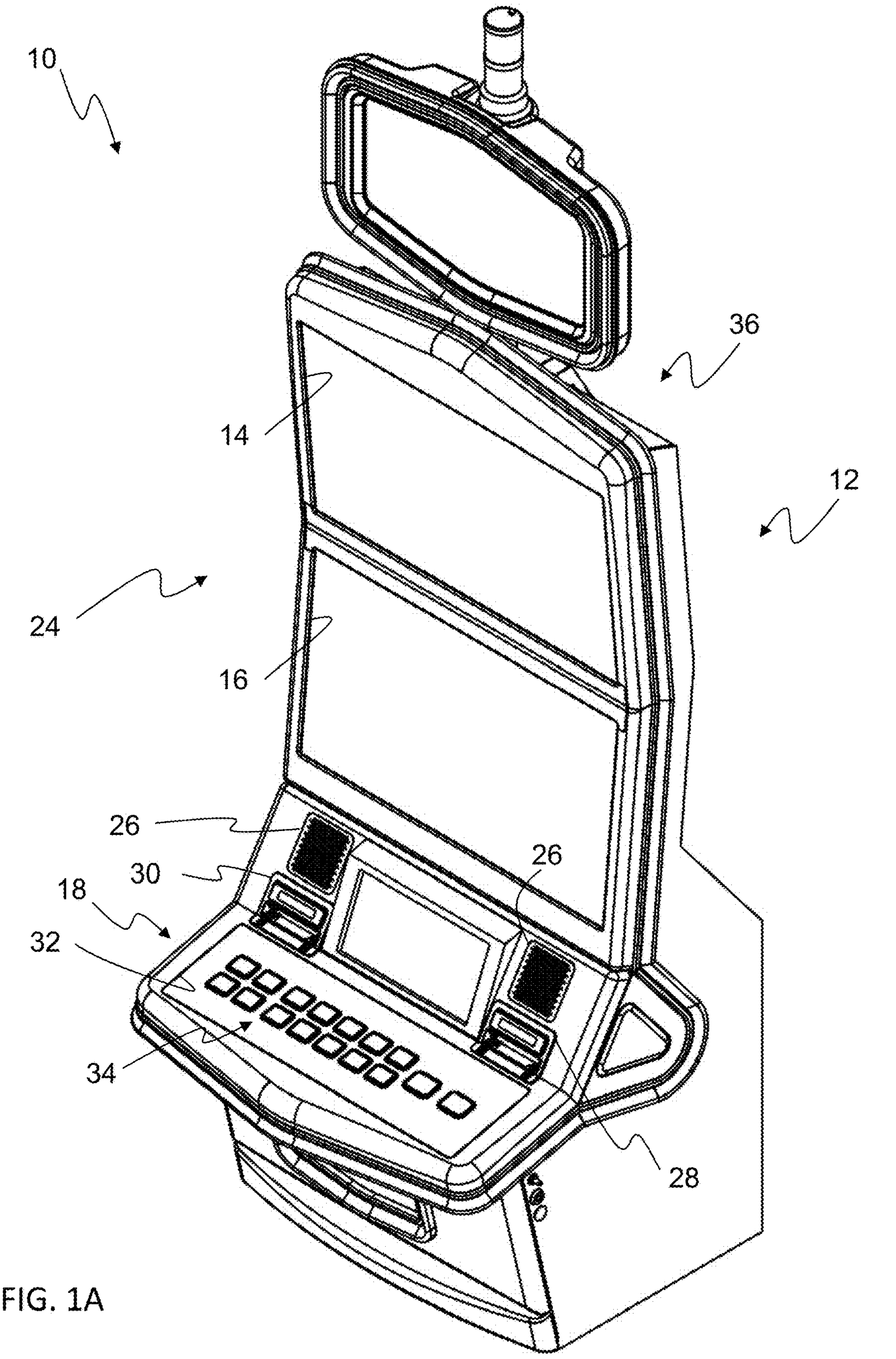
FIG. 1A is a perspective view of the gaming machine, according to the first embodiment.

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine and/or mobile computing device that provides a game to a player.

The present invention improves the functionality of existing gaming machines by providing a game execution program including computer instructions executed by a processor to operate a game that includes a primary game that includes cells that are populated with prize awards and randomly selected stacks of predefined symbols being associated with one or more columns that may be randomly increased based on bonus feature events. The number of symbols being displayed in a stack determines whether a prize being displayed in a cell is awarded to the player. In addition, bonus games are associated with each column and are displayed when a corresponding stack having a predefined number of symbols is displayed. The game execution program improves the ability of existing game machines to vary the volatility of game outcomes by using random numbers and trigger conditions to operate bonus feature events and operate bonus games in active or inactive modes based on the wager amount and bet denomination of a wager. Thus, increasing the flexibility of providing bonus awards to players during game play, and increasing the player's interest in playing the game. In addition, the present invention improves existing gaming machines by providing predefined symbols associated with columns, thus reducing the amount of computing resources required to render the symbols for display.

The gaming machine according to the present embodiment, receives a predetermined game value from the player, generates a game result, and provides a payout to the player according to the game result and one or more pay tables. FIGS. 1A-1D are perspective views and a front view, respectively, of a gaming machine 10, according to the present embodiment. As shown in FIGS. 1A-1D, the gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below) of the gaming machine 10. The game control unit 22 implements a random number generator (RNG) that is used during operation of the game. Each configuration is described below.

The upper display 14 and the lower display 16 may be flat panel display devices, such as both liquid crystal display devices and organic EL display devices and the like, and by controlling via the game control unit 22, the display area mentioned below functions as a display unit 24 provided to the player. As shown in FIGS. 1C and 1D, the gaming machine 10 may include a unitary display unit 24 that operates as both the upper and lower displays 14, 16.

Speakers 26 are provided on the left and right of the cabinet 12, and by controlling via the game control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the game control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the game control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the game control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a start button and a group of setting buttons. The start button receives an instruction to start an instance of the game. The group of buttons 34 includes a group of bet buttons, a denomination button, a max bet button, and a payout button and the like. The group of bet buttons receives an instruction operation regarding the bet amount of credits (bet number) from the player. The max bet button receives an instruction operation regarding the bet of the maximum amount of credits that can be bet at one time from the player. The payout button receives an instruction operation instructing a credit payout accumulated in the gaming machine 10. As shown in FIGS. 1C and 1D, in one embodiment, the operation unit 32 may include a touchscreen panel display that displays the graphic computer images of the group of buttons 34 and performs functions similar to the group of buttons 34 including transmitting player selections to the game control unit 22. The gaming machine 10 also includes illumination devices 36 that provides decorative lighting to the gaming machine 10.

Figure 1B:
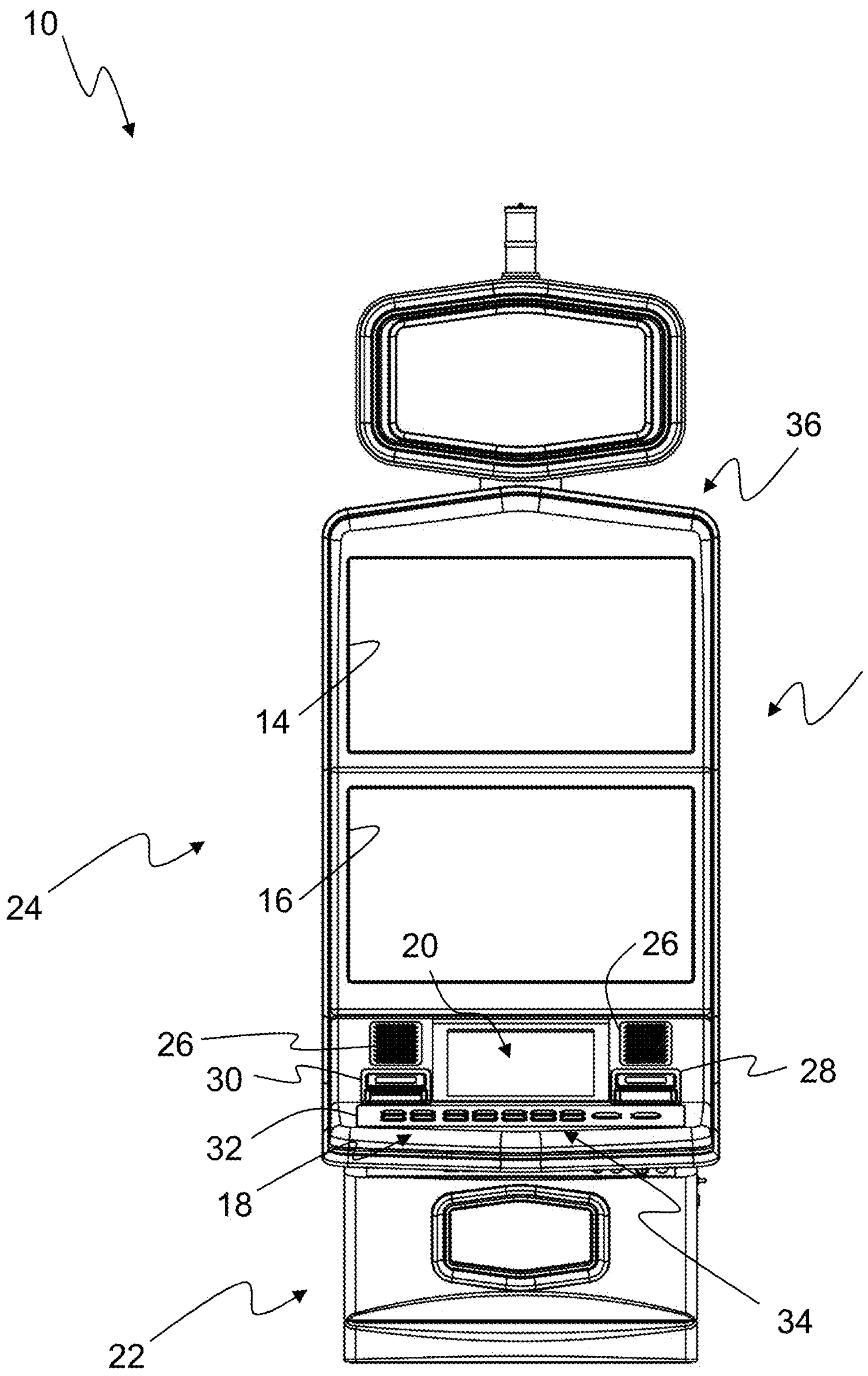
FIG. 1B is a front view of the gaming machine of FIG. 1A.
Figure 1C:
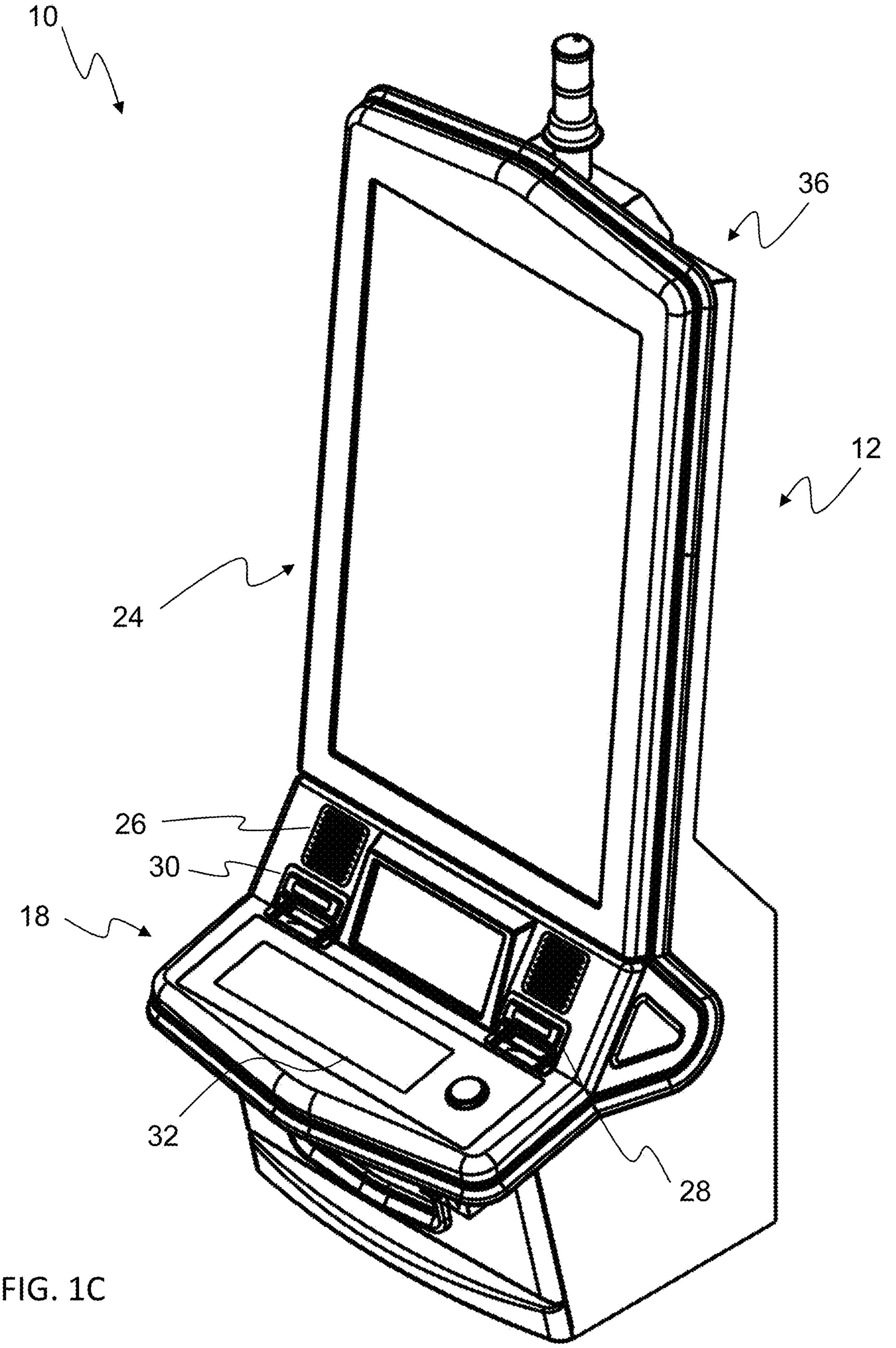
FIG. 1C is another perspective view of the gaming machine shown in FIG. 1A including a unitary display screen and operation unit with touchscreen panel.
Figure 1D:
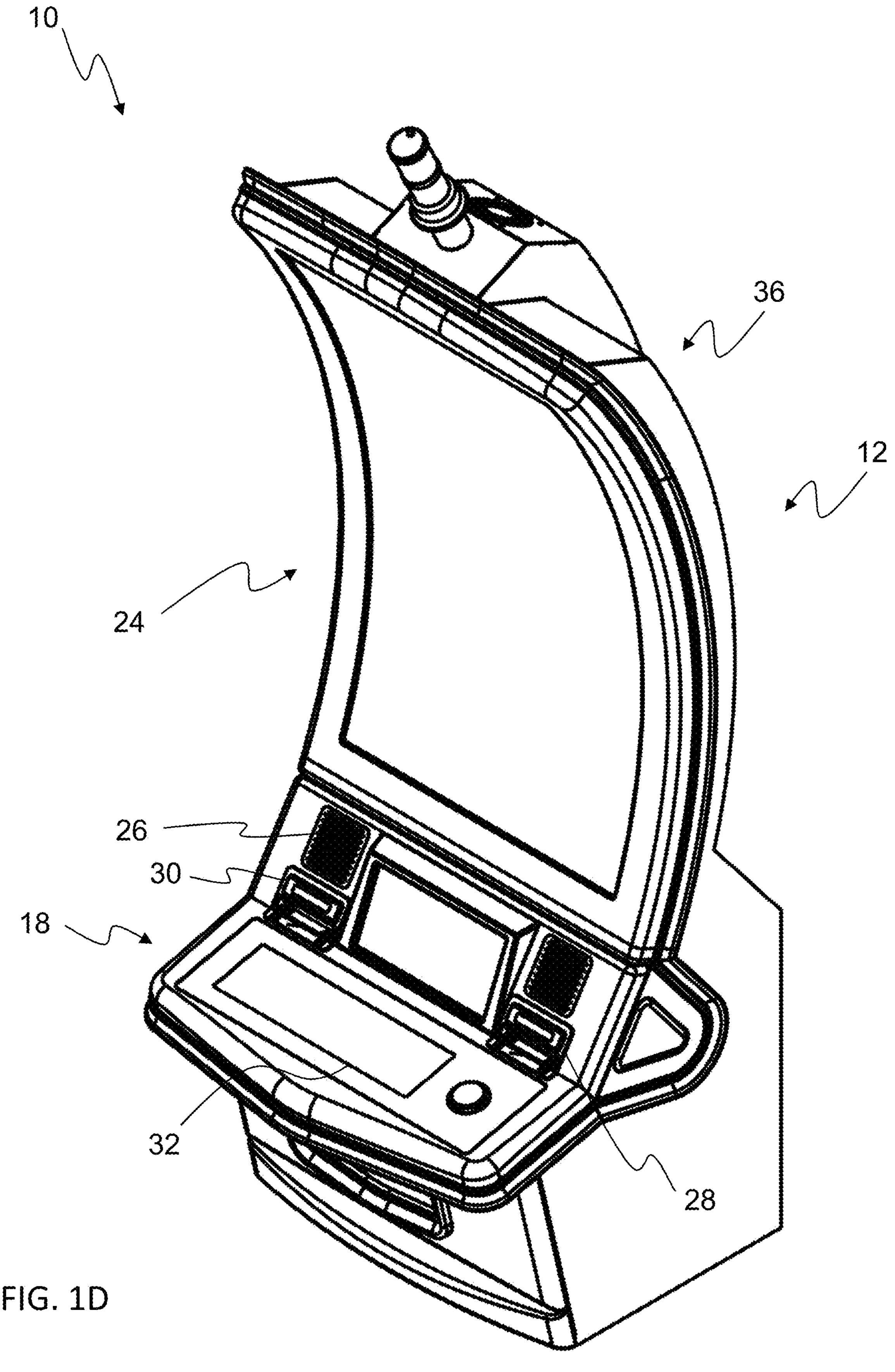
FIG. 1D is another perspective view of the gaming machine shown in FIG. 1A including a curved unitary display screen and operation unit with touchscreen panel.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The game control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
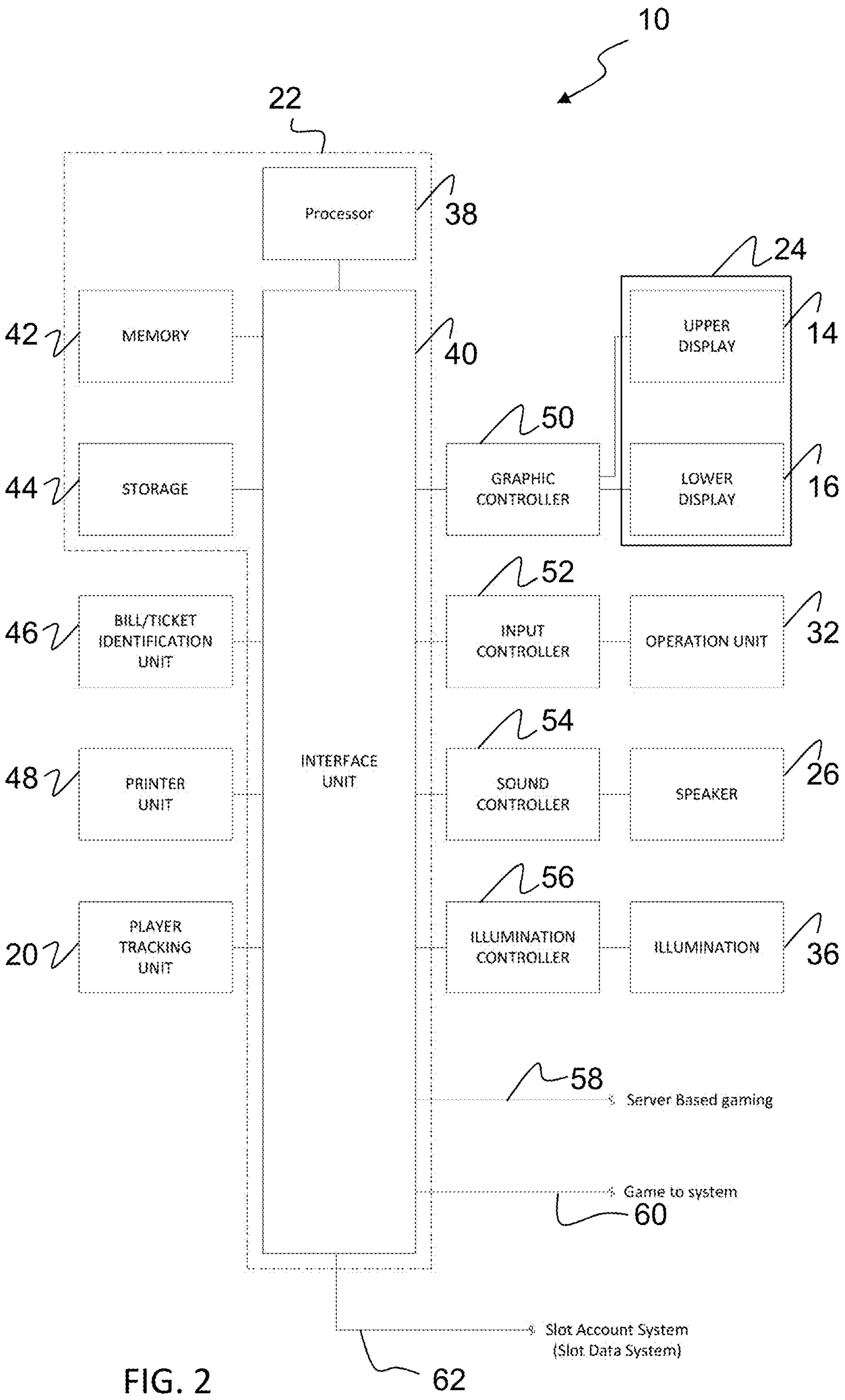
FIG. 2 is a functional block diagram of the gaming machine in FIGS. 1A-1D.

FIG. 2 shows a functional block diagram of the gaming machine 10, according to the present embodiment. With reference to FIGS. 1A, 1B, and 2, further on the inside of cabinet 12, a control board equipped with a central processing unit 38 (abbreviated as CPU below) including a processor that operates the game control unit 22, an interface unit (or part) 40, a memory device including a memory 42 and a storage 44, and the like are incorporated. The control board is configured so that communication is possible through the interface unit 40 and each of the components equipped on the cabinet 12 to control the operation of each part by executing the program recorded in the memory 42 and/or the storage 44, and provide a game to the player. The function of the CPU 38 is to execute and display the game on the displays 14, 16 of the gaming machine 10.

The interface unit 40 includes a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the game control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the game control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the game control unit 22 on the interface unit 40, and an illumination controller 56 that controls the illumination devices 36 to provide a decorative lighting effect may be connected.

The game control unit 22, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the game control unit 22 to the EEPROM of the memory 42, and stores a game execution program 45 (shown schematically in FIGS. 4-6B) and data files (shown in FIGS. 15-22, 32, and 33) of an application that provides a game. According to such a configuration, it can be easy to change or update a game by replacing the storage 44. Further, the game control unit 22 may be a multiprocessor configuration that has a plurality of CPUs.

Each block connected to the game control unit 22 is described below. The bill/ticket identification unit controller

46 operates the bill/ticket identification device 28 to receive bills/tickets in the insertion opening, and notifies the game control unit 22 of identifying information corresponding to the assortment of bills or the payout processing of credits. The bill/ticket identification unit controller 46 notifies the information to the game control unit 22, and the game control unit 22 increases the usable credit amount inside of the game according to the notified content. The printer unit controller 48 corresponds to the printer device 30, and under the control of the game control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the game control unit 22, and sends and receives information and the like of the player from the casino management system. The graphic controller 50 controls the display unit 24 including the upper display 14 and the lower display 16, under the control of the game control unit 22, and displays a display image that includes various graphic data. The sound controller 54 drives the speakers 26 under the control of the game control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3A:
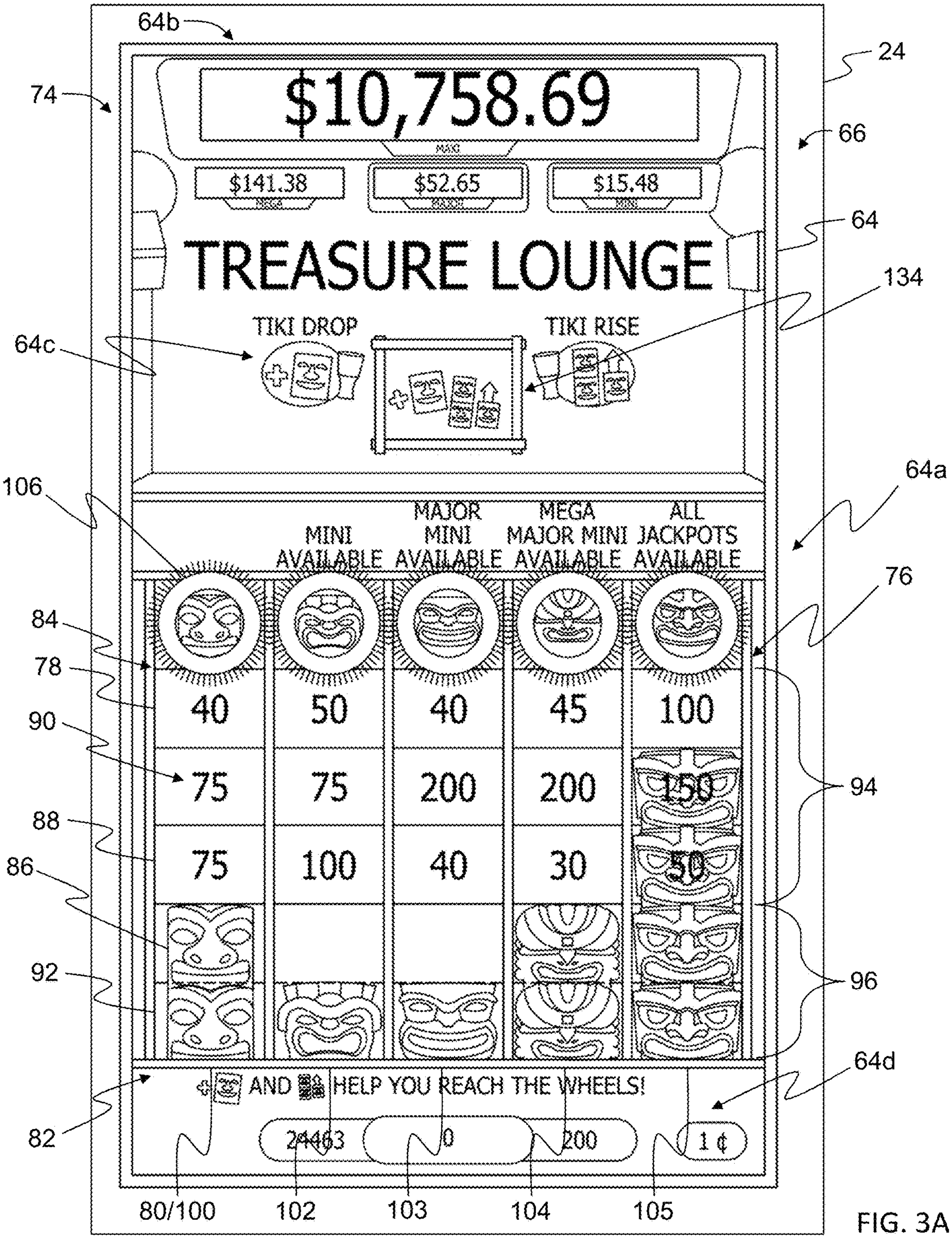
FIGS. 3A-3C are illustrations of a game displayed on a display area of the gaming machine in FIGS. 1A-2, according to an embodiment of the present invention.
Figure 3B:
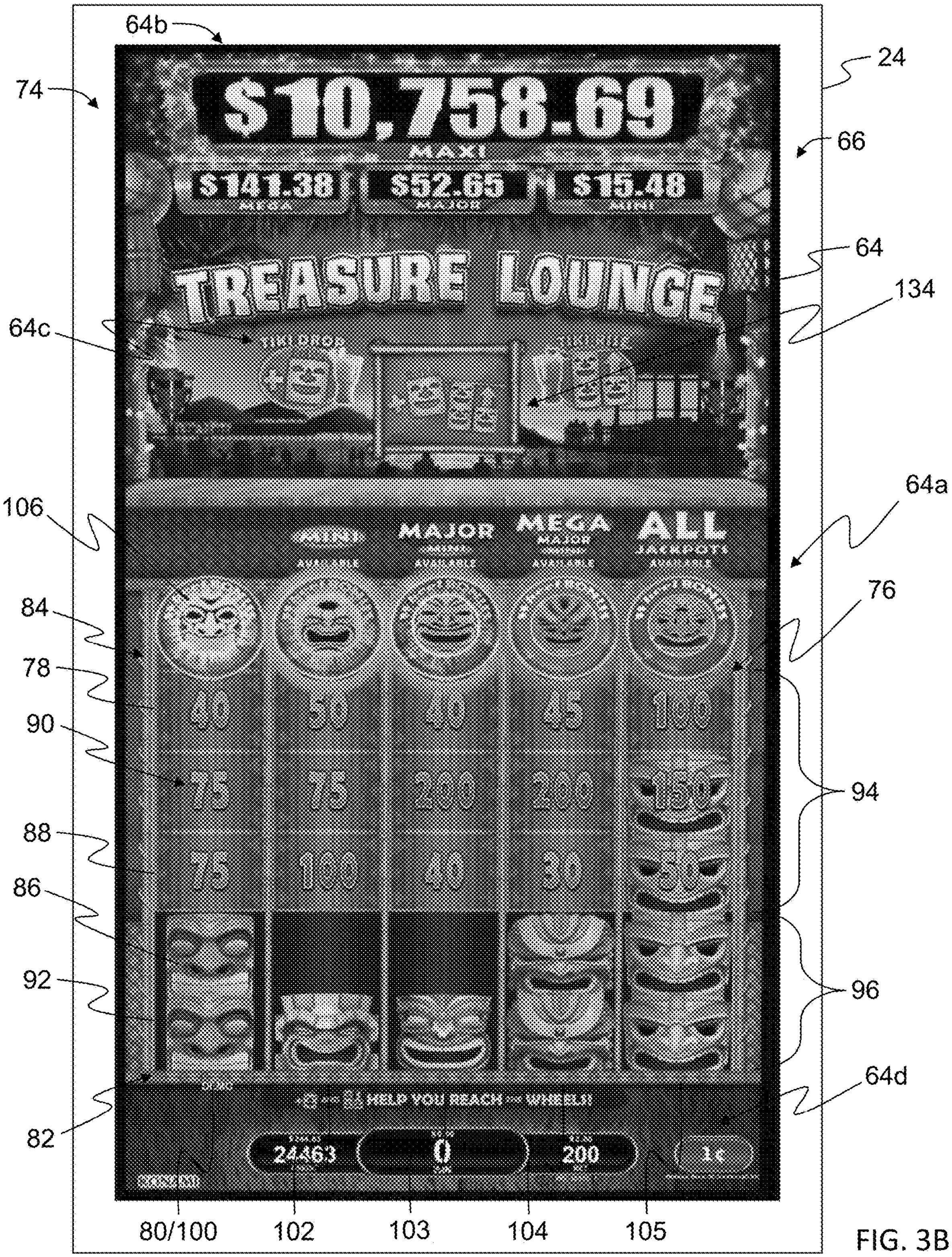
Figure 3C:
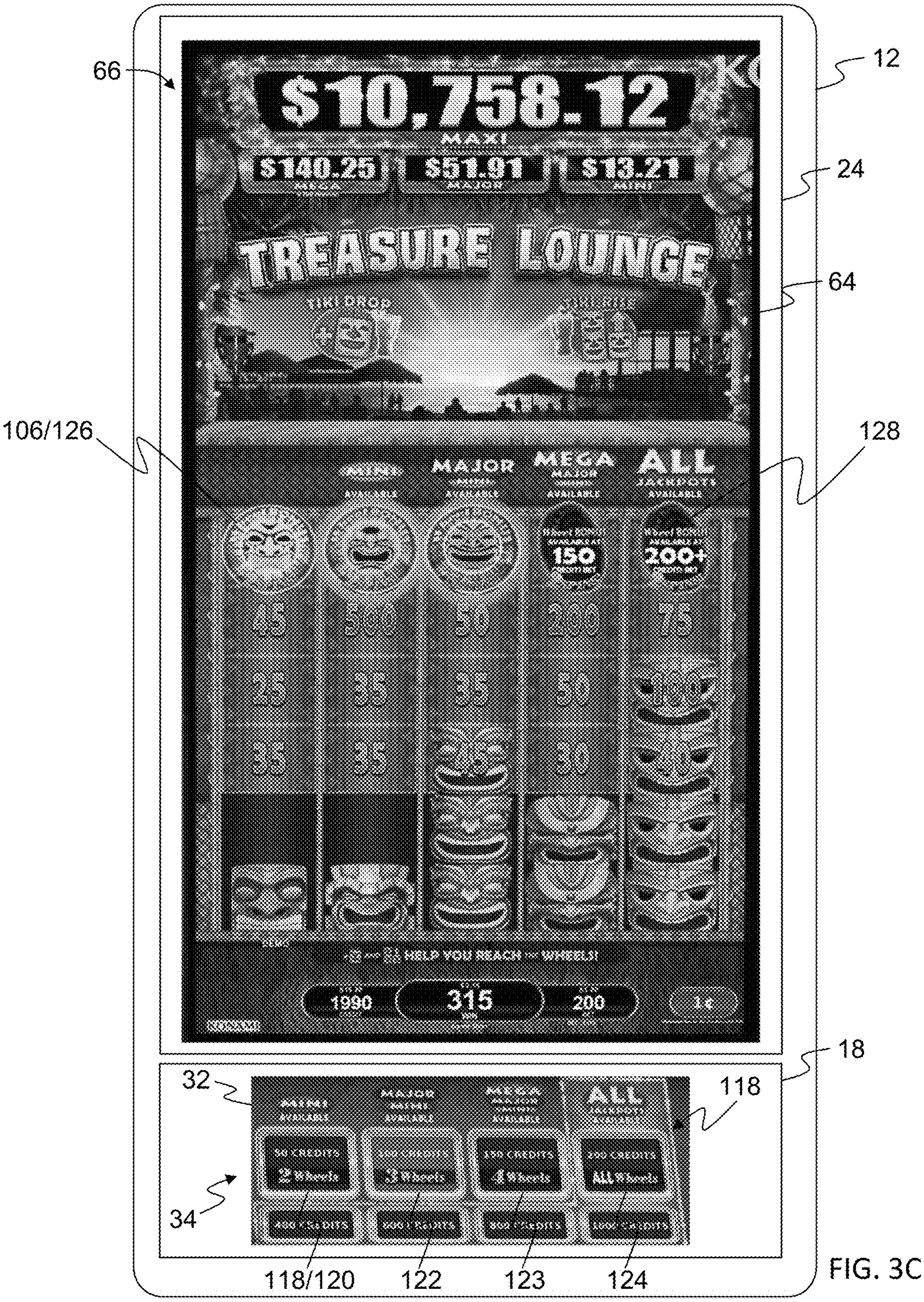
Figure 4:
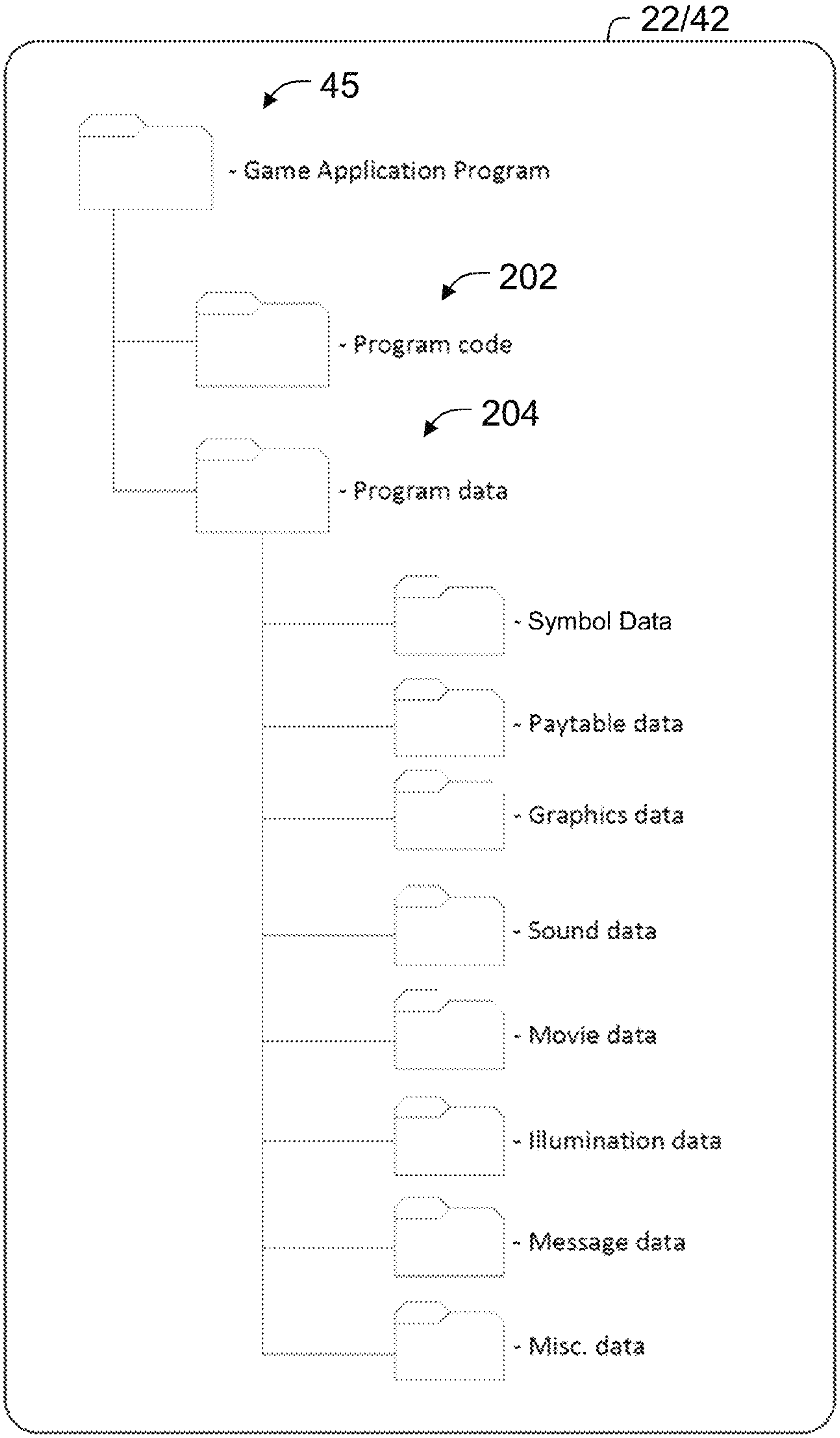
FIGS. 4-6B are block diagrams of a game control unit that may be used with to perform the function of executing a game on the gaming machine shown in FIGS. 1A-2.
Figure 5:
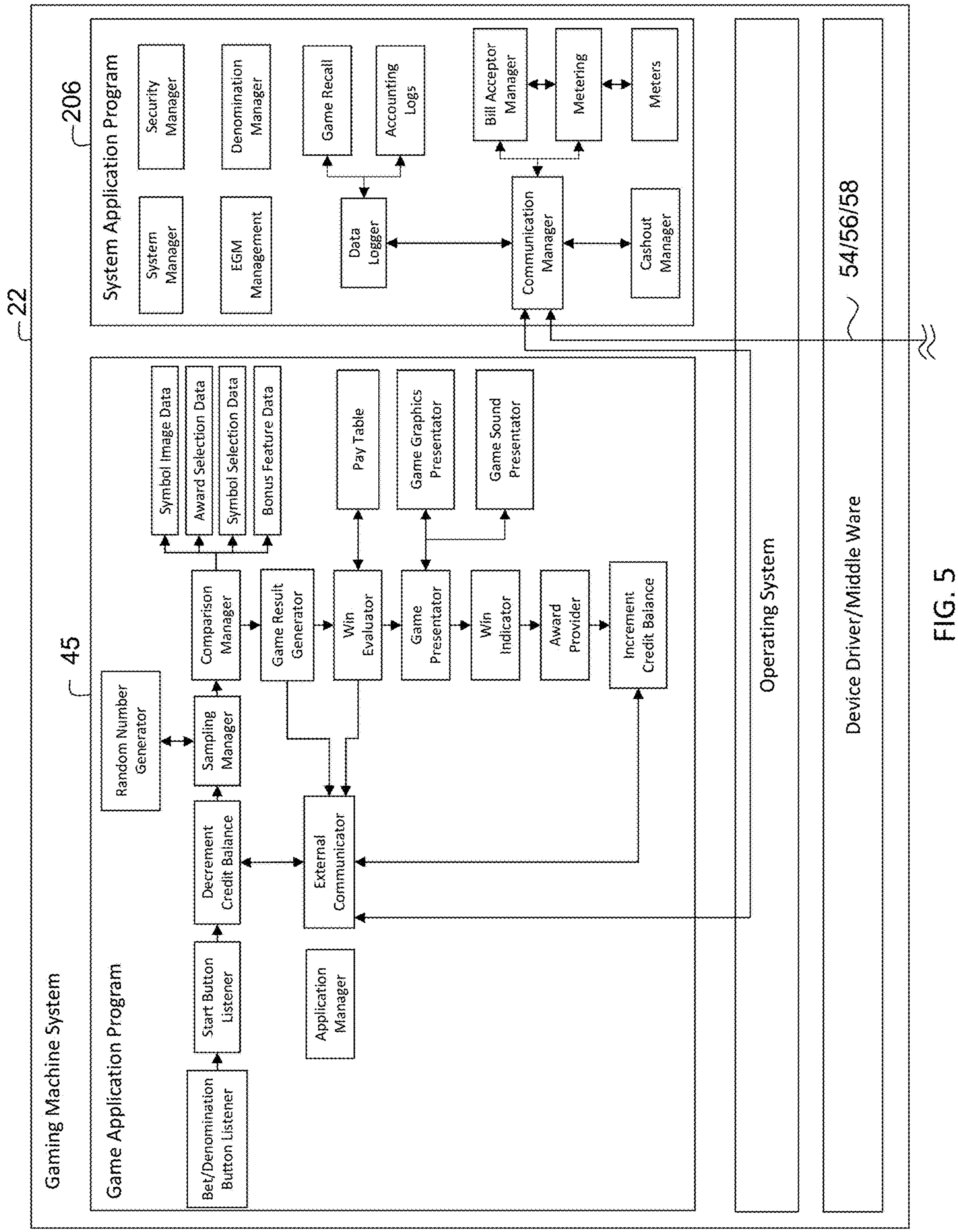
Figure 6A:
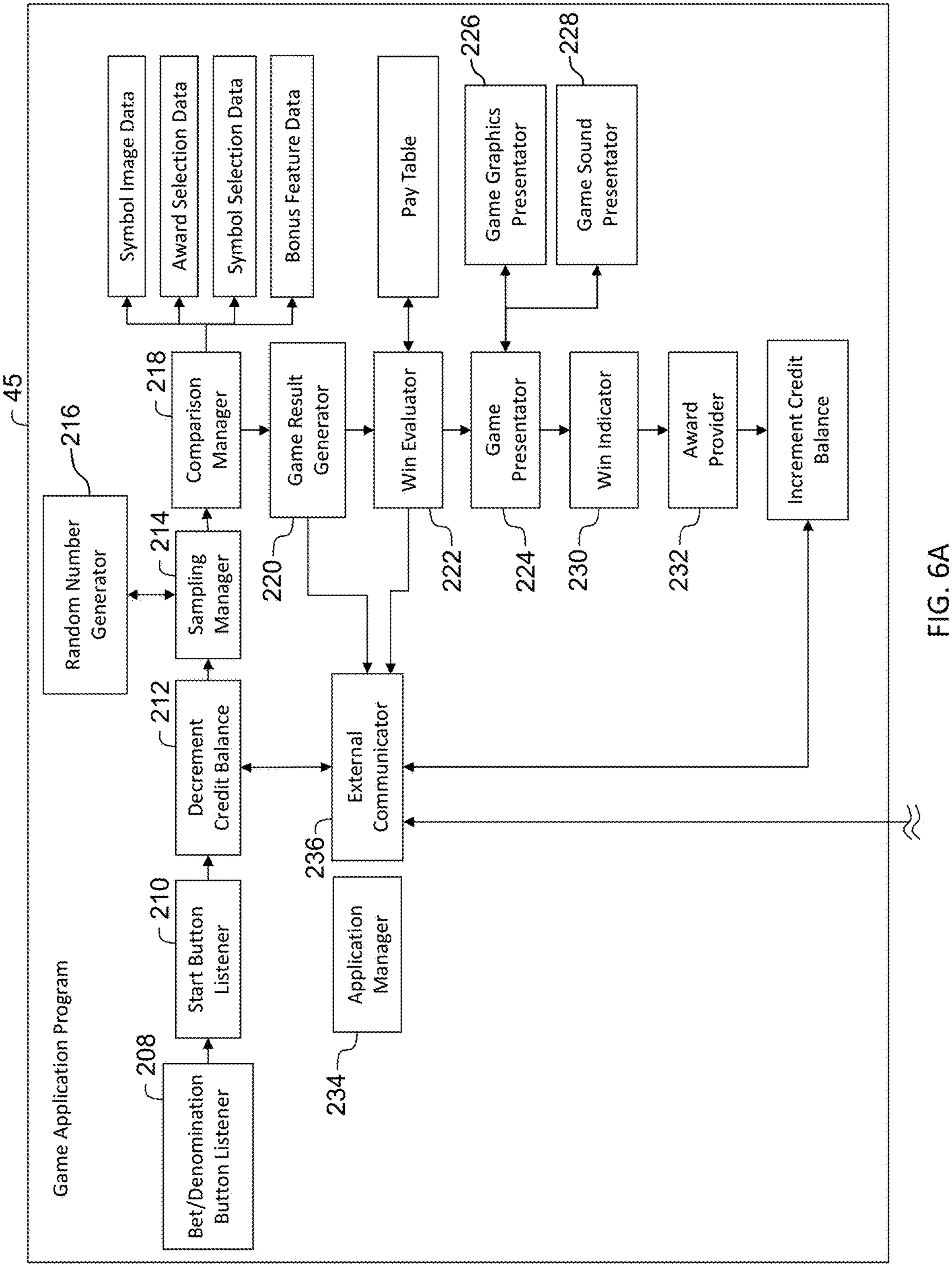
Figure 6B:
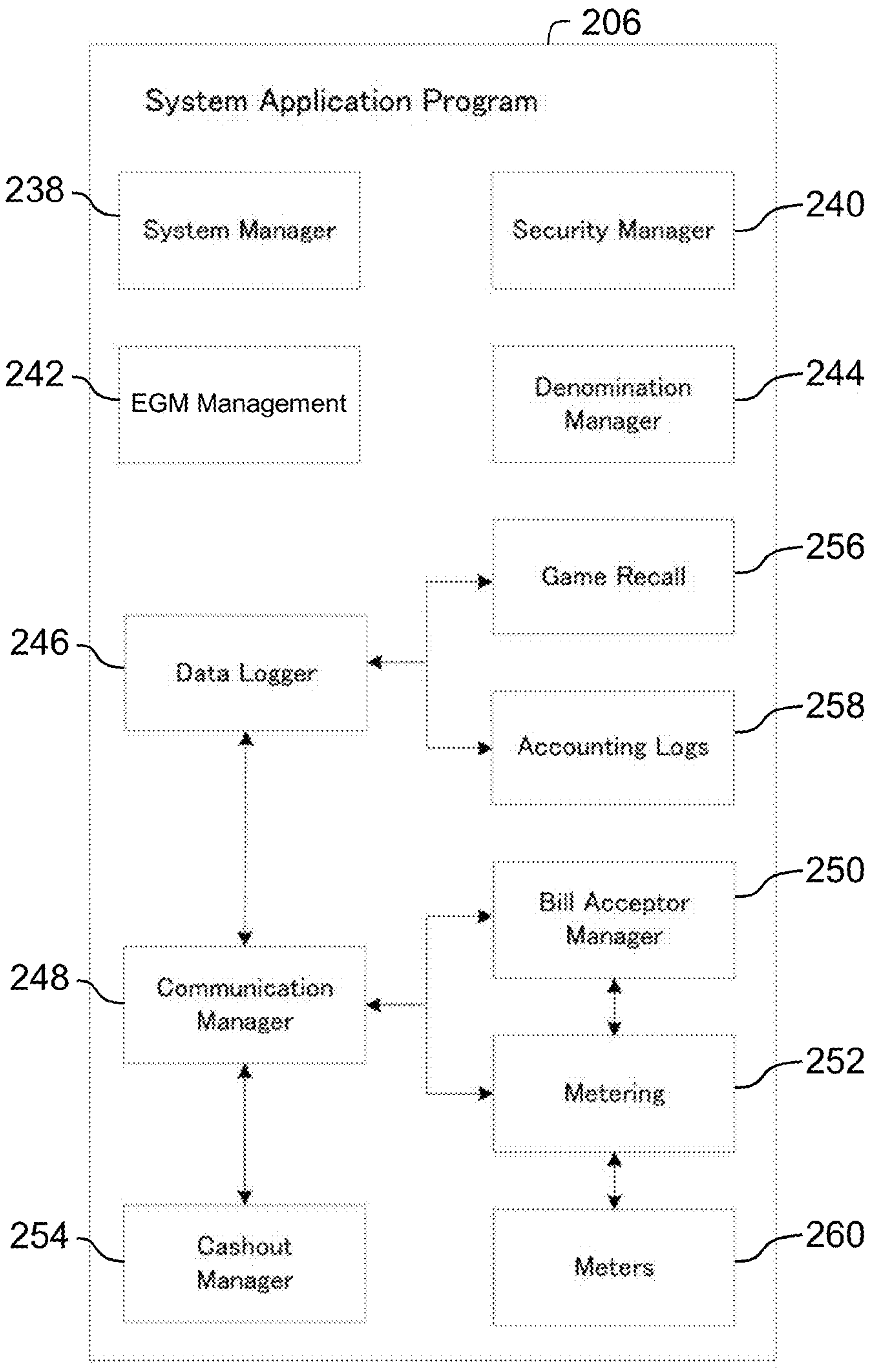

FIGS. 3A-3C schematically shows a display area 64 provided by the gaming machine 10. Such a display area 64 is displayed on the display unit 24 by the game control unit 22 executing a predetermined program.

In one aspect of the present invention, the game control unit 22 executes the game execution program 45 to provide a game 66 that includes a primary game 68 (shown in FIGS. 23A-23D) and one or more bonus feature events 70, 72 (shown in FIGS. 25-27D). The game control unit 22 displays the game 66 including a game screen 74 being displayed within the display area 64 of the gaming machine 10. In the illustrated embodiment, the game screen 74 includes a primary game display area 64*a*, a progressive prize display area 64*b*, a bonus feature display area 64*c*, and a credit meter display area 64*d*.

The credit meter display area 64*d* displays information associated with a credit meter of the game including, but not limited to, a credit amount including a current amount of credits available for wagering on the game, a credit amount obtained by winning (WIN number), an amount of a current wager, a current denomination of the game 66, and the like.

In the illustrated embodiment, the primary game display area 64*a* displays a grid 76 including a plurality of cells 78 arranged in a plurality of columns 80. Each column 80 includes a plurality of cells 78 that extend from a bottom end 82 of the column 80 to a top end 84 of the column 80. Each cell 78 is configured to selectively display a game symbol 86 during play of the game 66. In the illustrated embodiment, each column 80 includes a plurality of prize cells 88 that are configured to display awards 90 that may be provided to the player during play of the game 66. In one embodiment, the awards 90 may include game credit values that may be awarded to the player. In other embodiments, the awards 90 may include symbols associated with bonus features such as, for example, multiplier symbols, free game symbols, scatter symbols, bonus feature symbols, progressive awards, and the like. In the illustrated embodiment, one or more columns 80 includes one or more non-prize cells 92 that do not display an award 90. For example, as shown in FIG. 3B, in one embodiment, one or more columns 80 may include a first subset of cells 94 including a plurality of prize cells 88 and a second subset of cells 96 that includes one or more non-prize cells 92. The first and second subsets of cells 94 and 96 may be arranged with the column 80 such that the non-prize cells 92 are positioned adjacent to the bottom end 82 of the column 80 and the prize cells 88 are positioned between the non-prize cells 92 and the top end 84 of the column 80. In one embodiment, the prize cells 88 may be orientated in adjacent stacks of prize cells 88. Similarly, the non-prize cells 92 may also be oriented in adjacent stacks of non-prize cells 92. In other embodiments, one or more non-prize cells 92 may be positioned between one or more prize cells 88. In still other embodiments, one or more columns 80 may include only prize cells 88 stacked from the bottom end 82 to the top end 84 of the column 80.

Referring to FIGS. 3A-3C, in the illustrated embodiment, the grid 76 includes five columns 80 with each column 80 including five cells 78, with the first subset of cells 94 including a stack of three prize cells 88 and the second subset of cells 96 including a stack of two non-prize cells 92. In other embodiments, the game control unit 22 may be programmed to display the grid 76 having more or less than five columns 80 and/or display each column 80 having more or less than five cells 78. In addition, the game control unit 22 may be programmed to display one or more columns 80 with more or less than three prize cells 88 and/or more or less than two non-prize cells 92.

The game control unit 22 is programmed to display a plurality of game symbols 86 within one or more cells 78 of each column 80. The game symbols 86 are selected from a symbol set 98 (shown in FIG. 15). In the illustrated embodiment, the symbol set 98 includes picture symbols "PIC-A", "PIC-B", "PIC-C", "PIC-D", and "PIC-E". The game control unit 22 associates each game symbol 86 with a corresponding game symbol 86. For example, as shown in FIGS. 3A-3B, the grid 76 is displayed with five adjacent columns 80 including a 1st column 100, a 2nd column 102, a 3rd column 103, a 4th column 104, a 5th column 105. The game control unit 22 is programmed to display the game symbol PIC-A in the 1st column 100, display game symbol PIC-B in the 2nd column 102, display game symbol PIC-C in the 3rd column 103, display game symbol PIC-D in the 4th column 104, and display game symbol PIC-E in the 5th column 105. During game play, the game control unit 22 is programmed to randomly select a number of game symbols 86 to be displayed within a corresponding column 80, and display the selected number of game symbols 86 in a stack of corresponding game symbols 86 within the corresponding column 80. Upon displaying each stack of corresponding game symbols 86 within the corresponding column 80, the game control unit 22 is programmed to determining each prize cell 88 that is displayed with a corresponding game symbol 86 and provide the corresponding award being displayed in the prize cell 88 to the player. In other embodiments, the symbol set 98 may include other game symbols 86 and the game control unit 22 may be programmed to display a plurality of different game symbols 86 within each column 80.

Figures 28A, 28B:
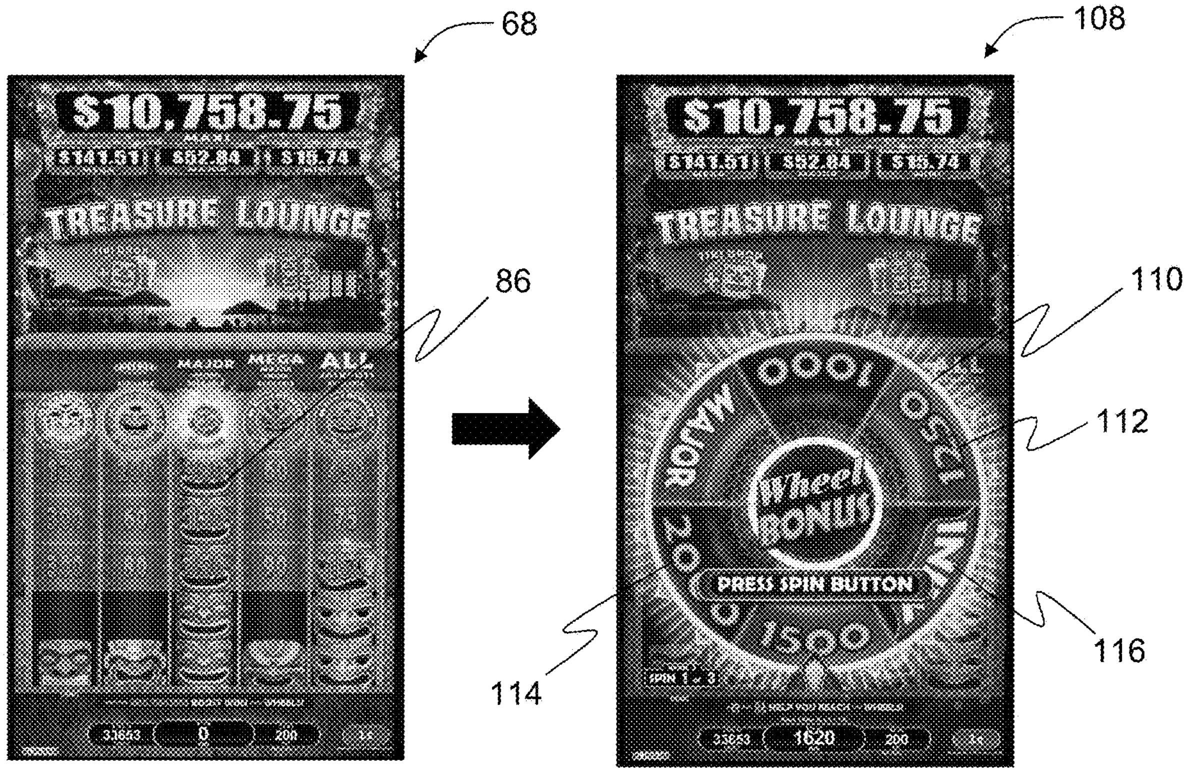

In the illustrated embodiments, a bonus game symbol 106 is displayed with each column 80 and is positioned adjacent to the top end 84 of each column 80. Each bonus game symbol 106 is associated with a bonus game 108 (shown in FIGS. 28A-28B) that may be executed during play of the primary game 68. In the illustrated embodiment shown in FIG. 28B, each bonus game 108 includes a prize wheel 110 that includes a plurality of award values 112 that may be awarded to the player during the bonus game 108. In one embodiment the game control unit 22 may be programmed to associate a different prize wheel 110 with each column 80. In addition, the game control unit 22 may programmed to display at least two prize wheels 110 with different award values 112. The game control unit 22 may also display one or more prize wheels 110 with one or more credit awards 114 and one or more progressive awards 116. For example, the game control unit 22 may be programmed to associate a first prize wheel with the 1st column 100 that includes a plurality of credit awards 114, a second prize wheel with the 2nd column 102 that includes a plurality of credit awards 114 and the “MINI” progressive award, a third prize wheel with the 3rd column 103 that includes a plurality of credit awards 114 and the “MINI” and “MAJOR” progressive awards, a fourth prize wheel with the 4th column 104 that includes one or more credit awards 114 and the “MINI”, “MAJOR”, and “MEGA” progressive awards, and associated a fifth prize wheel with the 5th column 105 that includes one or more credit awards 114 and the “MINI”, “MAJOR”, “MEGA”, and “MAXI” progressive awards. As shown in FIG. 28B, the value of the awards available on the prize wheels increases with each column 80.

The progressive prize display area 64*b* displays the value of each progressive award such as, for example, “MINI”, “MAJOR”, MEGA", and “MAXI”, that may be awarded during one or more bonus games 108.

Referring to FIG. 3C, in one embodiment, the game control unit 22 is programmed to operate one or more of prize wheels 110 in an active prize wheel mode and an inactive prize wheel mode. A prize wheel 110 being operated in the active prize wheel mode may be awarded during play of the primary game, whereas, a prize wheel 110 being operated in the inactive prize wheel mode is not available to be award during play of the primary game. In addition, the game control unit 22 may be programmed to operate one or more of prize wheels 110 in the active prize wheel mode and the inactive prize wheel mode based on a wager amount value of a wager being placed by the player on the primary game 68. For example, the game control unit 22 may display a plurality of wager selection buttons 118 on the operation unit 32. Each wager selection button 118 is associated with a corresponding wager value and one or more prize wheels 110. For example, the operation unit 32 may display a first wager selection button 120 that is associated with the first and second prize wheels, a second wager selection button 122 that is associated with the first, second, and third prize wheels, a third wager selection button 123 that is associated with the first, second, third, and fourth prize wheels, and a fourth wager selection button 124 that is associated with the first, second, third, fourth, and fifth prize wheels. During operation, upon detecting a player’s selection of the first wager selection button 120, the game control unit 22 operates the first and second prize wheels in the active prize wheel mode and operates the third, fourth, and fifth prize wheels in the inactive prize wheel mode. Upon detecting a player’s selection of the second wager selection button 122, the game control unit 22 operates the first, second, and third prize wheels in the active prize wheel mode and operates the fourth and fifth prize wheels in the inactive prize wheel mode. Upon detecting a player’s selection of the third wager selection button 123, the game control unit 22 operates the first, second, third, and fourth prize wheels in the active prize wheel mode and operates the fifth prize wheel in the inactive prize wheel mode, and upon detecting a player’s selection of the fourth wager selection button 124, the game control unit 22 operates the first, second, third, fourth, and fifth prize wheels in the active prize wheel mode. In addition, as shown in FIG. 3C, the game control unit 22 is programmed to display each bonus game symbol 106 in an active mode 126 indicating the corresponding prize wheel is operated in the active prize wheel mode or an inactive mode 128 indicating that the corresponding prize wheel is being operated in the inactive prize wheel mode. For example, as shown in FIG. 3C, the game control unit 22 has received a player’s selection of the second wager selection button 122 and operates the bonus game symbols 106 associated with the first, second, and third prize wheels in the active mode 126, and operates the bonus game symbols 106 associated with the fourth and fifth prize wheels in the inactive mode 128. In addition, each bonus game symbol 106 may be displayed with a number of spins of the prize wheel 110 that will be executed during the corresponding bonus game 108 (e.g. the number of prizes that will be awarded) if the corresponding bonus game 108 is initiated. In the illustrated embodiment, a bonus game 108 is initiated when a stack of corresponding game symbols 86 includes a predefined number of game symbols 86. For example, as shown in FIGS. 28A-28B, a bonus game 108 may be triggered when a column 80 includes a stack of corresponding game symbols 86 having a sufficient number of game symbols 86 to reach a full height of the column 80 (e.g. a game symbol being displayed in each cell associated with the column).

Figure 24A:
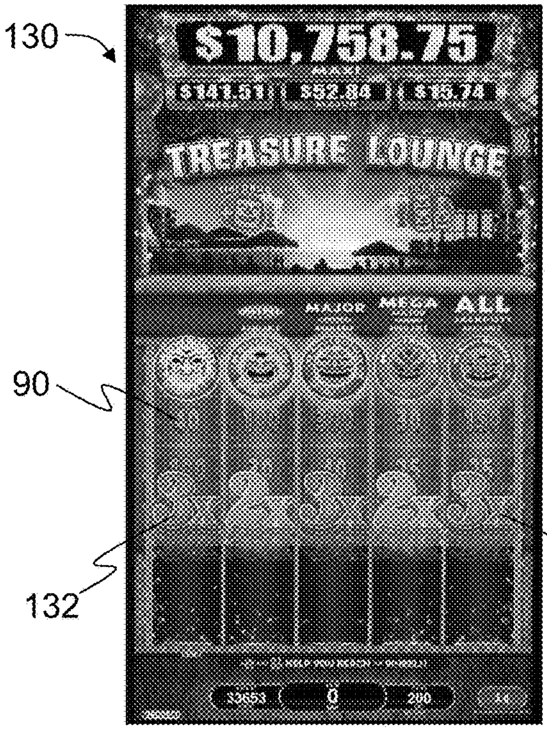
Figure 24B:
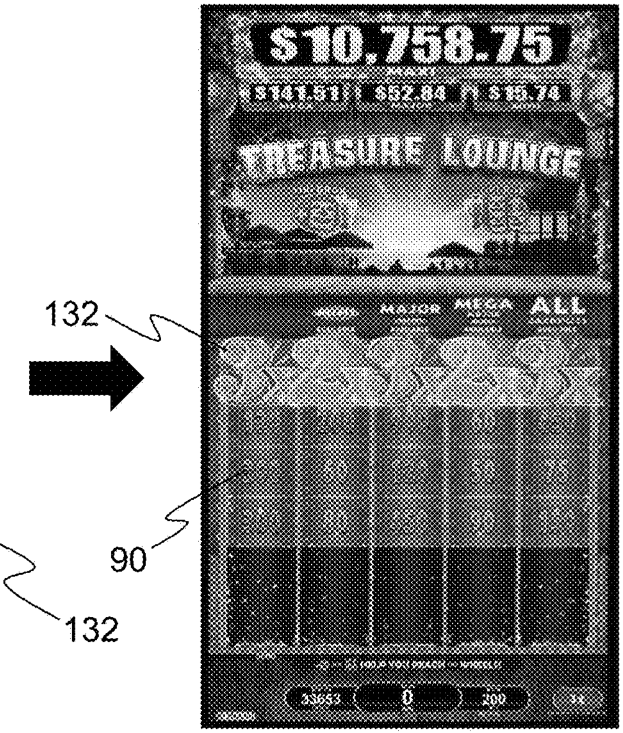
Figure 24C:
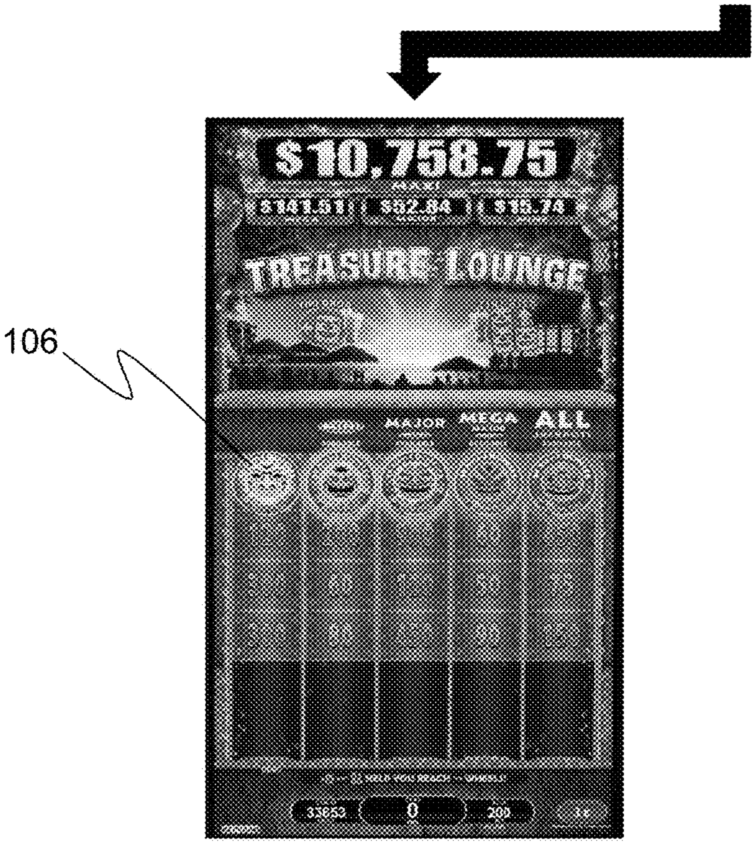
Figure 25:
Figure 26A:
Figure 26B:
Figure 26C:
Figure 26D:
Figure 27A:
Figure 27B:
Figure 27C:
Figure 27D:

Referring to FIGS. 24A-24C, in one embodiment, prior to displaying each stack of corresponding symbols 86 within each corresponding column 80, the game control unit 22 may be programmed to display a multiplier feature event 130 with the primary game 68. During the multiplier feature event 130 the game control unit 22 is programmed to select a multiplier value 132 associated with at least one of the column 80, and modify each award 90 being displayed in the column 80 based on the selected multiplier values 132. For example, the game control unit 22 may be programmed to populate each prize cell 88 with an initial award 90, and initiate the multiplier feature event 130 to increase the value of the award by the selected multiplier value 132. In addition, the game control unit 22 may also assign the number of spins of one or more prize wheels 110 equal to a corresponding multiplier value 132 and modify the bonus game symbol 106 to display the number of spins.

The bonus feature display area 64*c* displays a virtual bonus feature selection reel 134 that is used to select one or more bonus feature events 70 and 72 (shown in FIGS. 26A-27D) being displayed with the primary game 68. Each of the bonus feature events 70 and 72 increase the number of game symbols 86 being displayed in one or more stack of corresponding game symbols 86, which may provide additional awards and/or trigger one or more bonus games 108.

In one embodiment, the game control unit 22 displays the virtual bonus feature selection reel 134 with a bonus feature reel strip 136 (shown in FIGS. 21 and 25) that includes a plurality of stop positions and a plurality of bonus feature symbols 138 associated with each stop position. Each bonus feature symbol 138 is associated with one or more bonus feature events 70, 72. For example, the bonus feature reel strip 136 may include a “Bonus Feature A” symbol that is associated with a first bonus feature event 70 (shown in FIGS. 26A-26C), a "Bonus Feature B" symbol that is associated with a second bonus feature event 72 (shown in FIGS. 27A-27C), and a "Bonus Feature C" symbol that is associated with both the first and second bonus feature event 70, 72. During operation, the game control unit 22 is programmed to randomly selects a stop position using a random number selection, spins and stops the virtual bonus feature selection reel 134 to display the bonus feature symbol 138 associated with the randomly selected stop position and initiates the bonus feature event 70, 72 associated with the displayed bonus feature symbol 138. For example, if the virtual bonus feature selection reel 134 stops to display the "Bonus Feature A" symbol, the game control unit 22 initiates the first bonus feature event 70. If the virtual bonus feature selection reel 134 stops to display the "Bonus Feature B" symbol, the game control unit 22 initiates the second bonus feature event 72. If the virtual bonus feature selection reel 134 stops to display the "Bonus Feature C" symbol, the game control unit 22 initiates the first bonus feature event 70 and the second bonus feature event 72.

Referring to FIGS. 4-6B, in the illustrated embodiment, the memory 42 stores a game execution program 45 that includes computer executable instructions that, when executed by the processor 38, cause the processor 38 to generate and display the game on the display unit 24 of the gaming machine 10. In one embodiment, the game execution program 45 includes program code 202 and program object data 204 that includes computer executable instructions for implementing a game using the algorithms shown in FIGS. 9-14.

In the illustrated embodiment, the memory 42 stores the game execution program 45 and a system application program 206 that includes computer executable instructions that, when executed by the processor 38, cause the processor 38 to generate and display the game on the display unit 24 of the gaming machine 10. The game execution program 45 provides game specific/front-end functions and the system application program 206 program provides generic/back-end functions, when executed by the processor 38. In the illustrated embodiment, the game execution program 45 and the system application program 206 are implemented on the same operating system. However, it should be noted that these programs may be implemented on different operating system and/or by different processors. In one embodiment, the game execution program 45 includes a plurality of software modules including a bet/denomination/payline button listener module 208, a start button listener module 210, a credit balance manager module 212, a sampling manager 214, a random number generator 216, a comparison manager 218, a game result generator 220, a win evaluator 222, a game presentator 224, a game graphics presentator 226, a game sound presentator 228, a win indicator 230, an award provider 232, an application manager 234, and an external communicator 236. The game execution program 45 may also include the reel strip data files, the symbol image data files, the symbol selection data files, the reel stop position data file, the symbol cell selection weight table, the pay line set, and the paytable data file.

The bet/denomination button listener module 208 is a software module for receiving a signal from the bet button, or the denomination button which is generated by the button when a player operates the button to select number of bet or denomination. In response to receiving the signal, the bet/denomination button listener module 208 communicates the occurrence of the signal to application manager 234 for changing bet, denomination, or payline configuration of the game.

The start button listener module 210 is a software module for receiving a signal from the start button which is generated by the button when a player operates the button to start a game. In response to receiving the signal, the start button listener module 210 communicates the occurrence of the signal to application manager 234 for starting the game.

In response to receiving the signal from start button listener module 210, the application manager 234 requests the sampling manager 214 to obtain necessary number of random numbers from the random number generator 216.

The random number generator 216 generates random numbers based on predetermined algorithm of computational random generation method. The random number generator 216 may be a pseudorandom generator. In response to a request from sampling manager 214, the random number generator 216 returns random number. In some implementations, the random number generator 216 may be implemented in a central server. The random number generator 216 may be implemented as an integrated circuit or hard wired logic.

The comparison manager 218 compares the current state of the game or each random number with the award selection data files, symbol selection data files, and/or bonus feature data files and specifies corresponding award symbol, game symbol, bonus game, and/or bonus feature event based on each random number.

The game result generator 220 generates game result based on game symbol selections, bonus feature events, and/or bonus games.

The win evaluator 222 evaluates the game result with reference to the pay table.

The game presentator 224 provides game presentation process with visual and sound so as to form the predetermined game result finally.

The game graphics presentator 226 provides visual game presentation process on the display so as to form the predetermined game result finally.

The game sound presentator 228 provides sound presentation process by using sound controller and speakers.

The win indicator 230 indicates win combinations and payment condition of prize symbol formed in the game result.

The award provider 232 provides award credit to win meter based on the win evaluation.

The application manager 234 administrates activity and status of each software module. In addition, the application manager 234 administrates configuration, progress and states of the game execution program 45.

The external communicator 236 communicates instruction and data with the system application program 206.

The credit balance manager module 212 executes a process for decrementing credit balance and incrementing credit balance based on win amount displayed in win meter.

In the illustrated embodiment, the system application program 206 provides back ground processing and functions other than game specific functions. The system application program 206 includes a plurality of software modules including a system manager 238, a security manager 240, a EGM management module 242, a denomination manager 244, a data logger 246, a communications manager 248, a bill acceptor manager 250, a metering module 252, and a cashout manager 254.

The system application program 206 may also include a game recall file 256, accounting logs 258, and meters 260.

The system manager 238 is a software module for administrating all of the back ground processing and functions other than game specific functions conducted by the system application program 206.

The security manager 240 is a software module for administrating game verification, door security and monitoring security sensors.

The EGM management module 242 is a software module for administrating data accumulation and communicating with external EGM information system 62.

The denomination manager 244 is a software module for establishing denomination setting of the gaming machine 10. The denomination setting may include 1 cent, 2 cent, 5 cent, 25 cent, 1 dollar, 5 dollar and the like.

The data logger 246 is a software module for logging result of each primary game, bonus feature event, and/or bonus games to the game recall. In addition, the data logger 246 stores error events, bill log, cashout log, ticket log etc. to the accounting log.

The game recall file 256 is an accumulated data including results of each primary game and bonus games. The game recall file 256 is stored in a non-volatile memory.

The accounting logs 258 is an accumulated data including error events, bill log, cashout log, ticket log etc. The accounting logs 258 are stored in a non-volatile memory.

The communications manager 248 is a software module for administrating communication between game execution program 45 and system application program 206. The communications manager 248 also administrates network communication between system application program 206 and external network such as slot management system network, G2S network, gaming server for server based gaming network or VLT system network.

The bill acceptor manager 250 is a software module for administrating the bill acceptor and receives bill information inserted in the bill acceptor. In response to receiving the information from the bill acceptor, the bill acceptor manager 250 communicates with the metering for incrementing credit balance based on the inserted bill.

The metering module 252 is a software module for adjusting values of the meters 260 in response to communication with the game execution program 45 via communications manager 248, the bill acceptor manager 250 or the cashout manager 254. The meters 260 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 254 is a software module for administrating cashout procedure. In response to a player's operation on the cashout button, the cashout manager 254 is activated and the gaming machine pay total amount of the credit meter.

Figure 7:
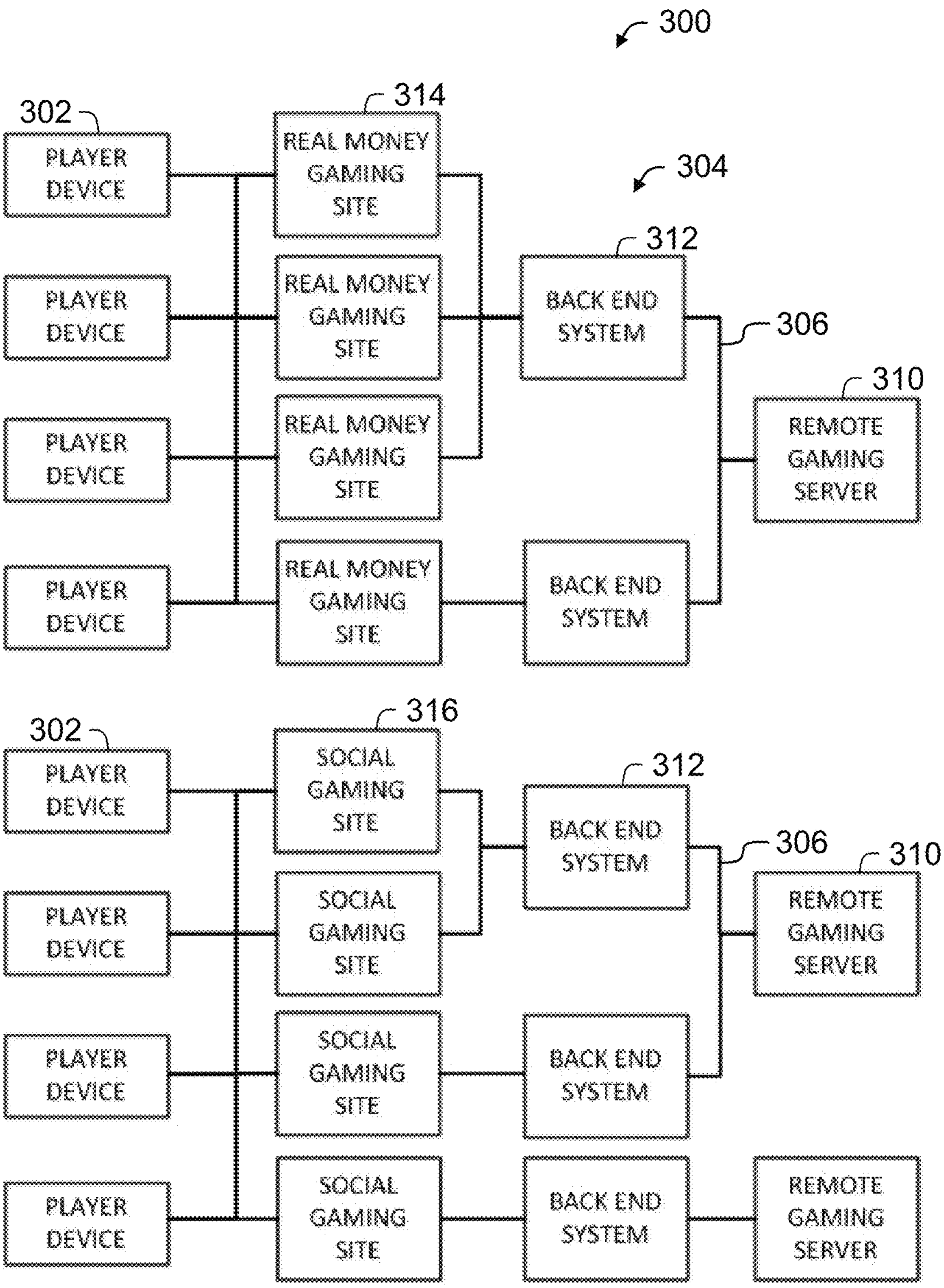
FIG. 7 is a functional block diagram of a server computer system, according to an embodiment of the present invention.
Figure 8:
FIG. 8 is a front view of a mobile computing device that may be used with the server computer system of FIG. 7.

Referring to FIGS. 7 and 8, in one embodiment, the present invention includes a networked server computer system 300 that is configured to deliver the game to one or more client computing devices 302 over the Internet. In the illustrated embodiment, the networked computer system 300 includes an iGaming server system 304 that is coupled in communication with one or more client computing devices 302 via a communications network 306. The communications network 306 may be any suitable connection, including the Internet, an Intranet, LAN, a virtual private network (VPN), cellular networks, etc. . . . , and may utilize any suitable or combination of technologies including, but not limited to wired and wireless connections, always on connections, connections made periodically, and connections made as needed.

The client computing device 302 may include any suitable device that enables a user to access and communicate with the server system 300 including sending and/or receiving information to and from the server system 300 and displaying information received from the server system 300 to a user. In the illustrated embodiment, the client computing device 302 includes a processor coupled to a memory device. The memory device stores various programs and data that are executed by the processor for operating the client computing device 302. The client computing device 302 also includes an input device configured to receive operational inputs from the user, and a display device configured to display a graphical user interface. The input device and display device enable a user to interact with the server system 300 via the client computing device 302. For example, in one embodiment, the client computing device 302 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 302 may be programmed to function as the game control unit 22 of the gaming machine 10.

In the illustrated embodiment, the client computing device may include a web browser program stored in the memory device. The processor executes the web browser program to display web pages on the display device that includes information received from the server system 300 to enable a user to interact with and operate the server system 300.

In one embodiment, the client computing device 302 includes a mobile computing device 308 (shown in FIG. 8) such as, for example, a tablet computer, a smartphone/tablet computer hybrid, a smartphone such as an iPhone™, and the like. The mobile computing device 308 includes a processor coupled to a memory device for storing various programs and data for use in operating the mobile computing device 308. The mobile computing device 308 may also include a display unit 24 including a touchscreen, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 308 may also include a Wi-Fi antenna, a cellular network antenna, a Bluetooth™ communications device, assisted GPS and GLONASS, a digital compass, and an iBeacon™ microlocation device.

The mobile computing device 308 may be programmed to store and execute mobile computer program applications that display graphical user interfaces on the touchscreen display unit 24 including display area 64 that allows the user to access the server system 300 to retrieve and store information within the server system 300 as well as interact with and operate the server system 300. In addition, in one embodiment, the server system 300 may install one or more mobile computer application programs in the memory device of the mobile computing device 308. When initiated by the processor of the mobile computing device 308, the mobile computer application program causes the processor of the mobile computing device 308 to perform some or all of the functions of the gaming machine 10.

In the illustrated embodiment, the server system 300 includes one or more remote gaming servers 310, one or more back-end servers 312, one or more real money gaming website hosting servers 314, and one or more social gaming website hosting servers 316. In the illustrated embodiment, the social gaming website hosting server 316 and the real money gaming website hosting server 314 are programmed to host a website that is accessible by a user via one or more client computing devices 302. The website hosting servers 314 and 316 execute a website application program that retrieves application code from the back-end server 312 and executes the application code to render one or more webpages on a display device of a client computing device 302 in response to requests received from the user via the client computing device 302 to allow users to interact with the website. The website hosting servers 314 and 316 are configured to generate and display webpages displaying a game. For example, the real money gaming web site hosting server 314 is configured to host a real money wagering website that enables players to convert monetary funds to gaming credits that may be used to place wagers on the game. The social gaming website hosting server 316 is configured to host a social media and/or social gaming website that allows players to receive gaming credits for activities such as purchasing goods and/or services through an e-commerce website, and/or purchase gaming credits that may be used to play the game.

Each back-end server 312 is configured to perform operations to support the functions of the webpages and/or website being displayed by the website hosting servers 314 and 316. For example, in one embodiment, the back-end servers 312 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 310 includes one or more copies of the game execution program 45 stored in a memory device of the remote gaming server 310. A processor of the remote gaming server 310 is programmed to retrieve and transmit the game execution program 45 to one or more back-end servers 312 for use in displaying the game to the user via a webpage being displayed by the web browser program.

In one embodiment, the game execution program 45 may include instructions for rendering the game and executing the game on the client computing device 302. For example, the game execution program 45 may include instructions for generating rendered code, such as, for example HTML code, which may be used by the web browser program of the client computing device 302 for displaying the game. For example, the game execution program 45 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 314, 316 via the back-end server 312, the remote gaming server 310 may execute the game execution program 45 to operate the game, and execute a render-to-string operation to generate rendered code indicative of the game, such as, for example HTML code, and transmit the rendered code to the back-end server 312. The back-end server 312 may then transmit the rendered code to the corresponding website hosting servers 314, 316 for use in displaying the game on the website. As the player plays the game, the remote gaming server 310 may execute the game execution program 45 for each instance of the game, and transit rendered code to the back-end servers 312.

In another embodiment, the remote gaming server 310 may transmit the game execution program 45 to the back-end server 312 and/or the website hosting servers 314, 316. The back-end server 312 and/or the website hosting servers 314, 316 may then execute the game execution program 45 to initiate the instances of the game and execute render-to-string operations to generate rendered code indicative of the game.

In yet another embodiment, the back-end server 312 may receive a request to initiate the game from a mobile computing device 308 executing the mobile computer application program. Upon receiving the request, the back-end server 312 may access the game execution program 45 and execute a render-to-string operation to generate rendered code indicative of the game and transmit the rendered code to the mobile computing device 308. In one embodiment, the back-end server 312 may continuously execute the game execution program 45 to generate each instance of the game using a random number generator of the back-end server 312 based on input received from the mobile computing device 308 and generate and transmit rendered code for each instance of the game to the mobile computing device 308. In another embodiment, the back-end server 312 may execute a partial-render operation and generate partially-rendered code of the game using the game execution program 45, and transmit the partially rendered code of the game and object data of game assets to the mobile computing device 308. The partially rendered code includes instructions for generating rendered code using the game assets and a random number generator of the mobile computing device for generating and displaying the game on the mobile computing device 308 using the mobile computer application program.

In one embodiment, the game execution program 45 may be stored on several different servers. The game code on these servers is used to distribute game content to social or real money gaming websites and mobile applications. The distribution method is very flexible. For example, the game code and/or game execution program 45 including game code and game object assets may be stored on a remote gaming server 310. One remote gaming server 310 may be connected to one or more back-end server 312.

Each back-end server 312 is configured to distribute the games to one or more websites or mobile applications. Players connect to these websites/mobile applications with the client devices or mobile devices and have access to the game content. A copy of game execution program 45 including game code and game object assets is stored on the remote gaming server 310 for each back-end server 312 that is connected to the remote gaming server 310 and that distributes the game. For example, if one remote gaming server 310 is connected to two back-end servers 312, which is connected to three website hosting servers 314, 316 that distribute the game, the remote gaming server 310 would store two copies of the game execution program 45 including game code and game object assets for the game (e.g., one copy for each back-end server 312).

For example, the server system 300 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 310 via the real money gaming site 314 or the social gaming site 316 and execute the game code on the client computing device 302. In this embodiment, the game code may provide game specific/front-end function when executed by the processor of the client computing device, and the back end system 312 may provide generic/back-end function.

FIGS. 9-14 are flow charts of methods 400, 500, 600, 700, 800, and 900 illustrating the algorithms included in the game execution program 45 and performed by the processor 38 when executing the game execution program 45 for operating the gaming machine 10 and/or iGaming server system 304 to implement the game. The methods include a plurality of steps. Each method step may be performed independently of, or in combination with, other method steps. Portions of the methods may be performed by any one of, or any combination of, the components of the gaming machine 10 and/or iGaming server system 304. FIGS. 23A-28B and 31A-31C are diagrammatic illustrations of the game being displayed on the display area of the gaming machine in FIGS. 1A-1D and the mobile computer device shown in FIG. 8, according to an embodiment of the present invention. FIGS. 15-22, 32, and 33 are exemplary illustrations of computer program data files that may be used by processor 38 when executing the game execution program 45.

In the illustrated embodiment, the game execution program 45 includes computer instructions for generating the primary game 68 and one or more bonus feature events 70, 72 on the game screen 74. The game control unit 22 displays the primary game 68 one or more bonus feature events 70, 72 by executing the algorithm steps illustrated in methods 400-800. In one embodiment, the game control unit 22 is programmed to execute method 400 to initiate the primary game 68. The game control unit 22 may also be programmed to execute method 500 to initiate the primary game 68.

Figure 9:
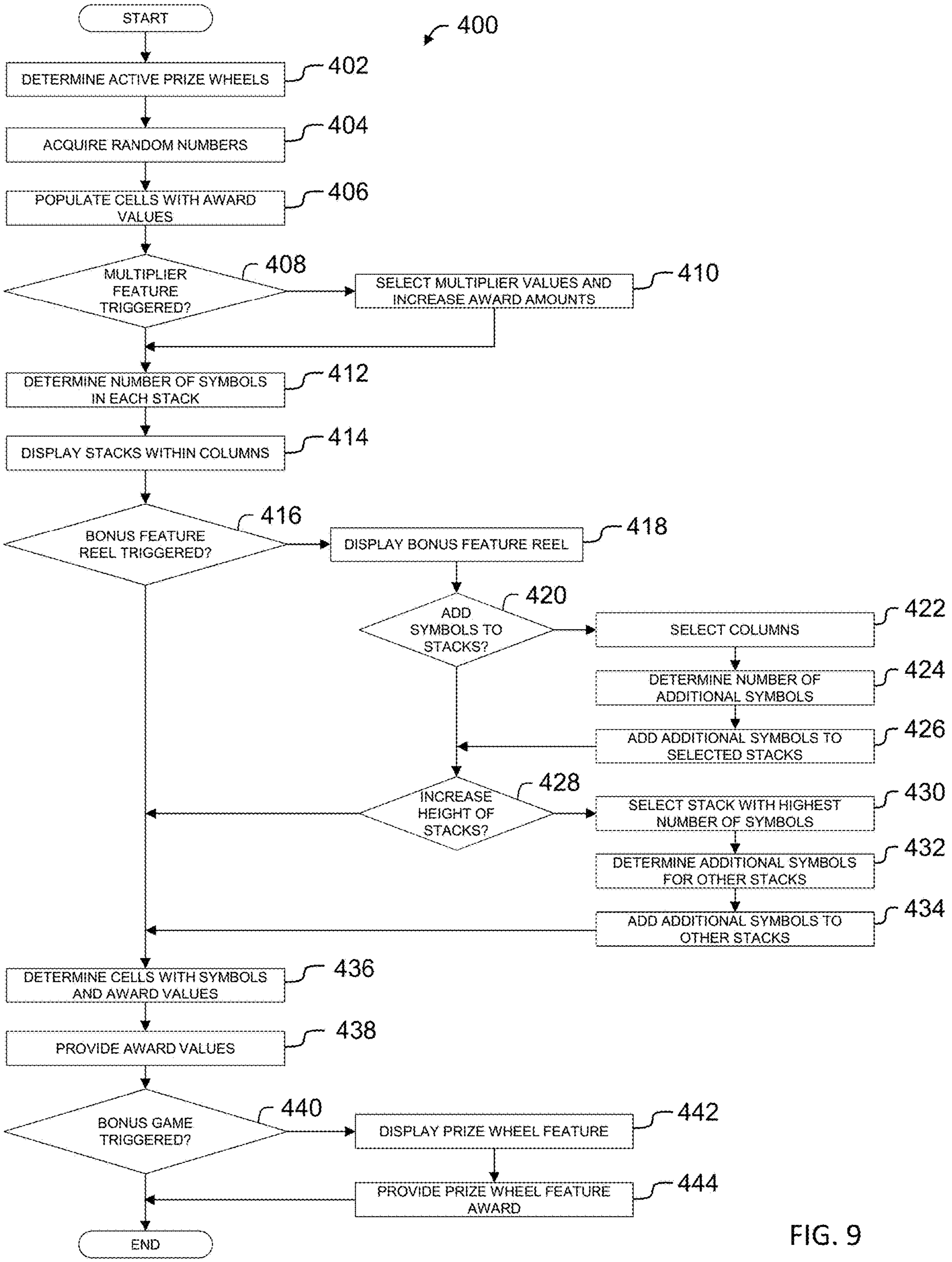
FIGS. 9-14 are flow charts illustrating the algorithms used during operation of the gaming machine and/or the mobile computing device to execute the game shown in FIG. 3A-3C, according to one embodiment of the present invention.
Figure 10A:
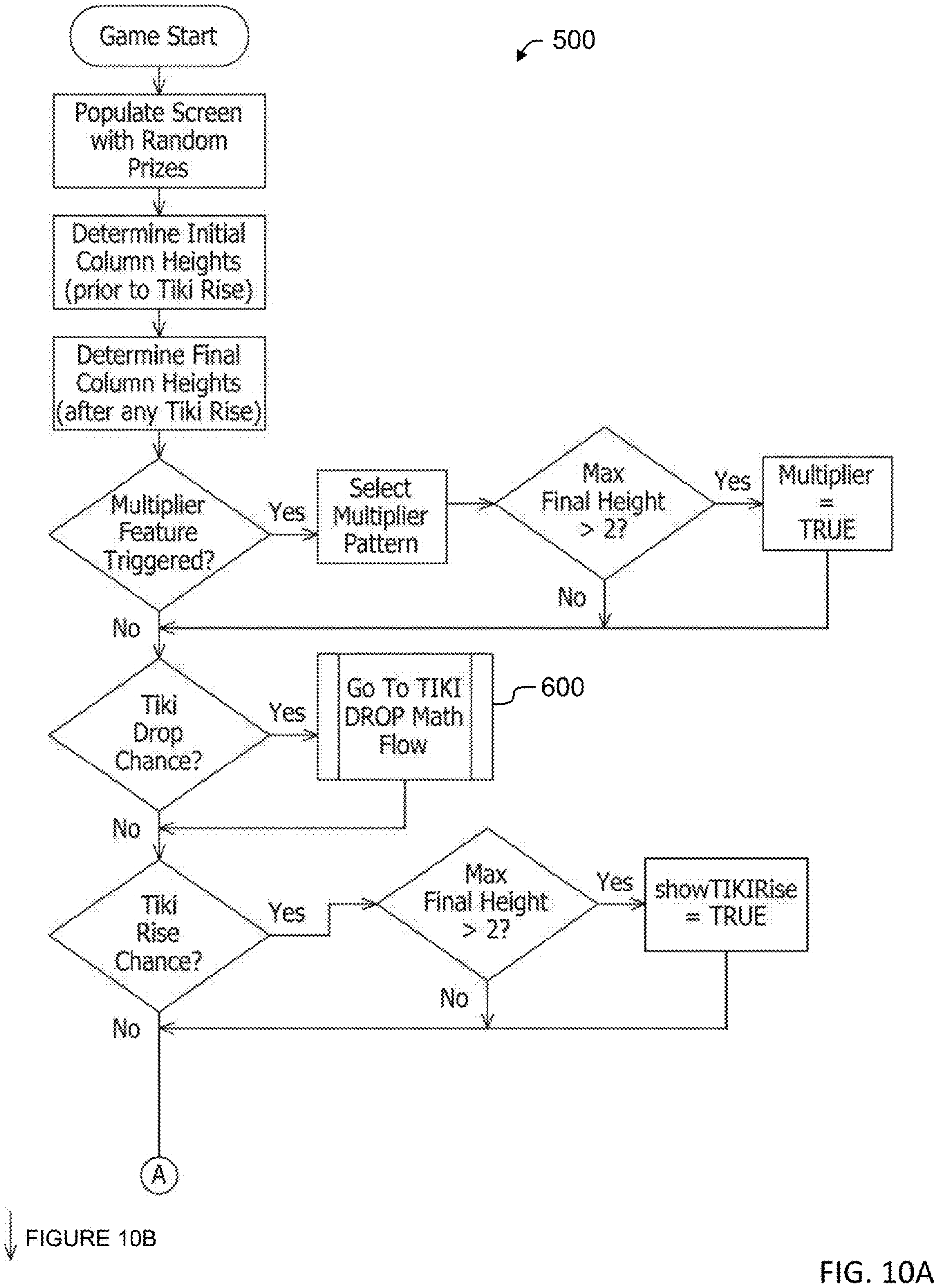
Figure 10B:
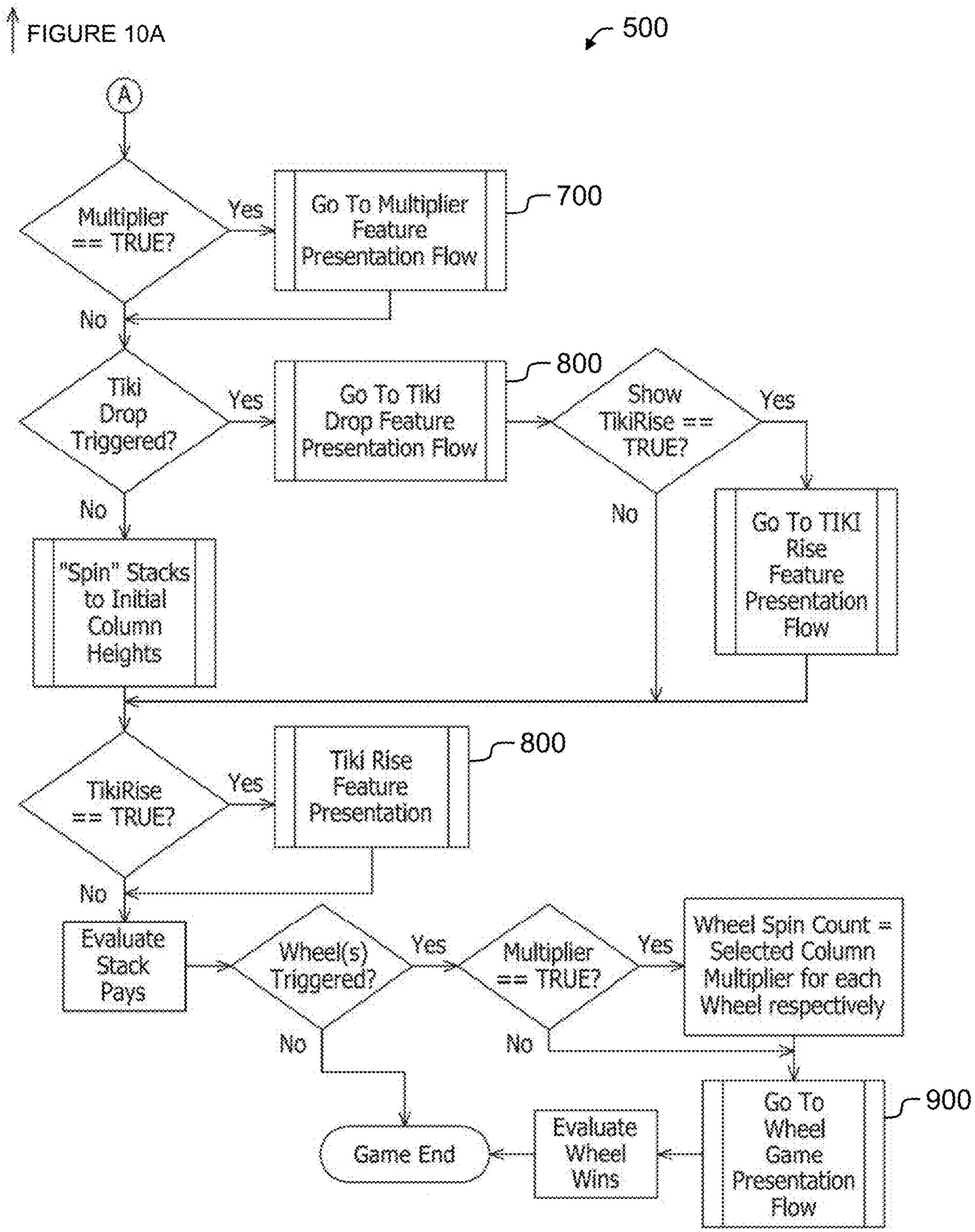
Figure 11:
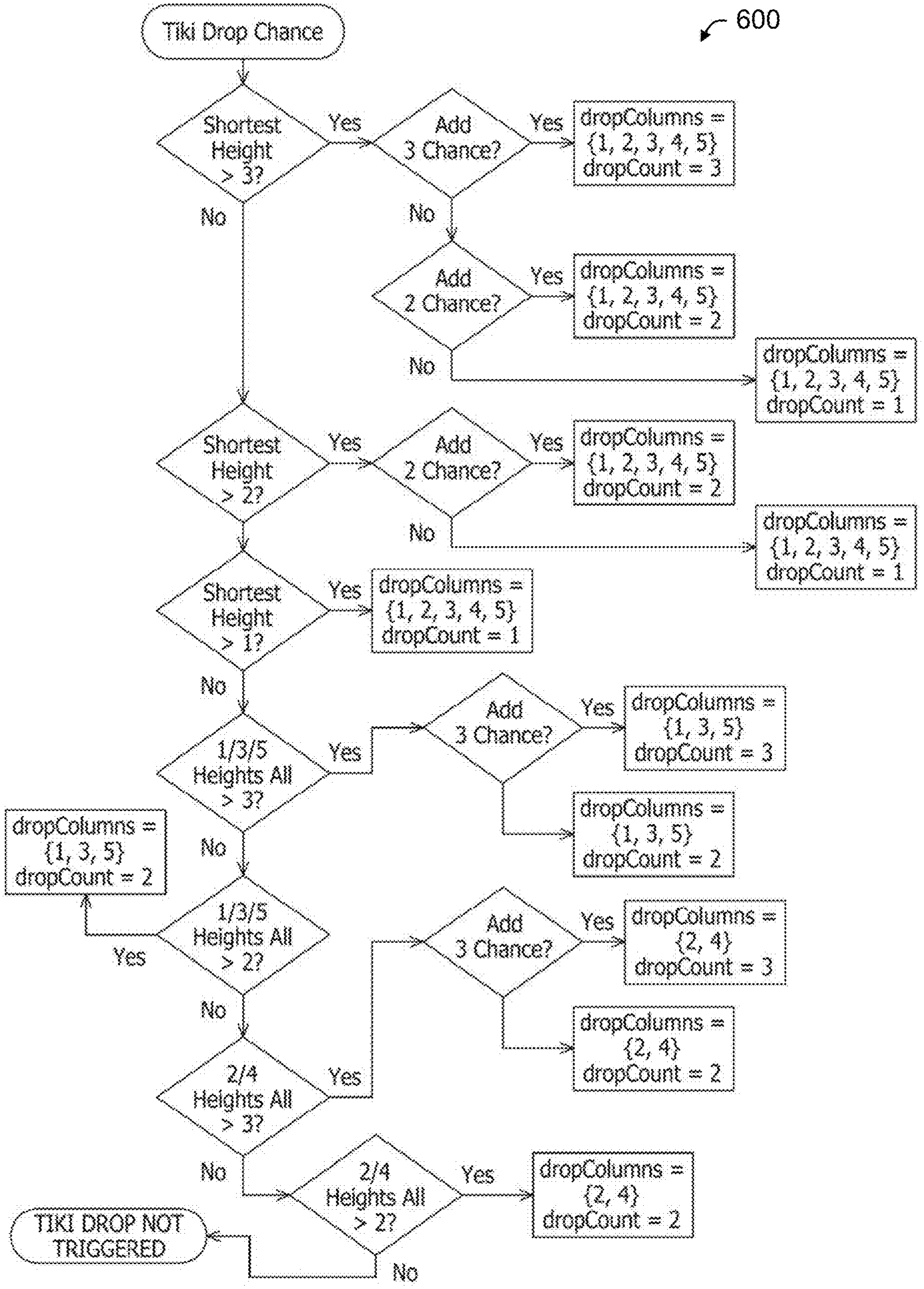
Figure 12:
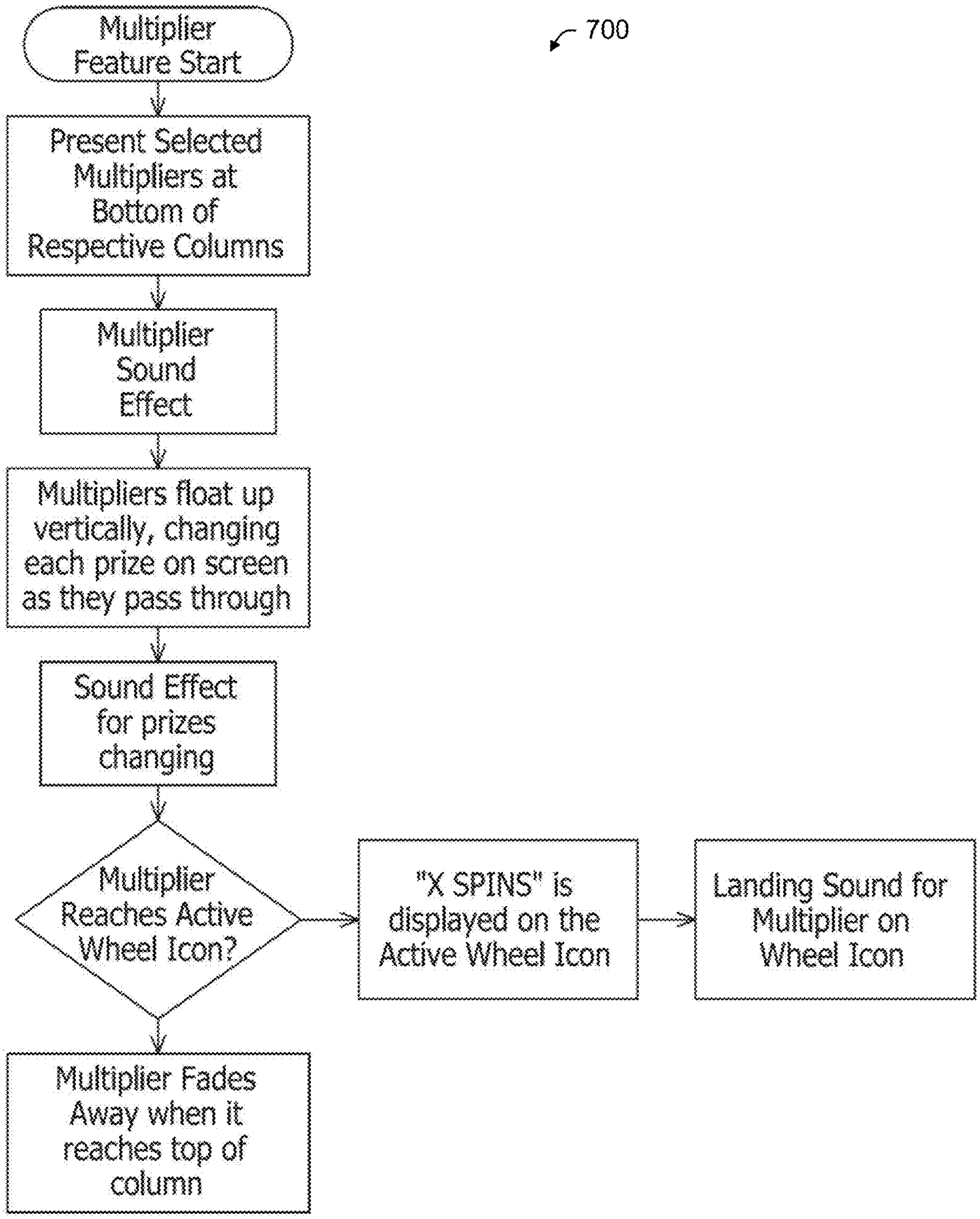
Figure 13A:
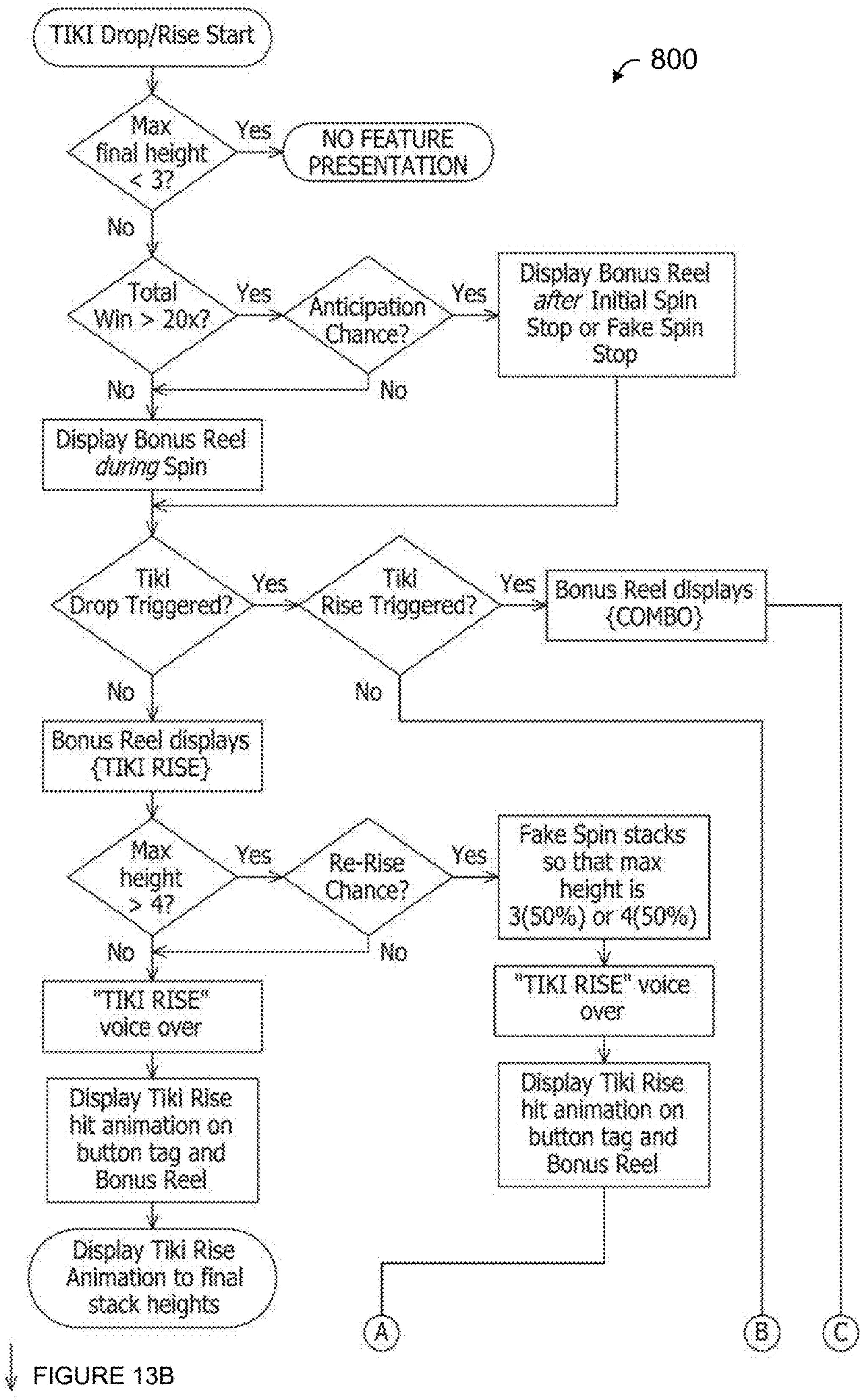
Figure 13B:
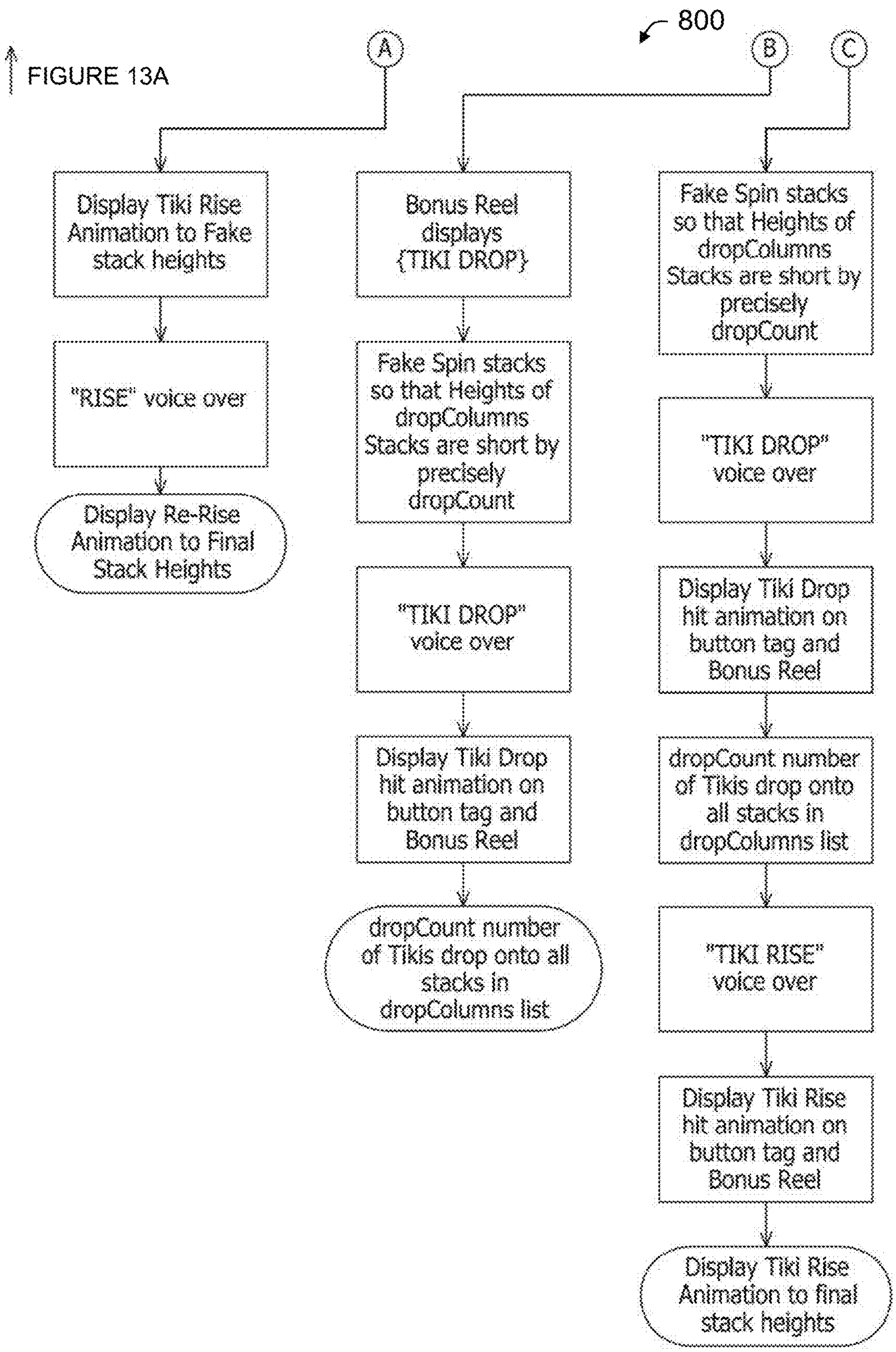
Figure 14:
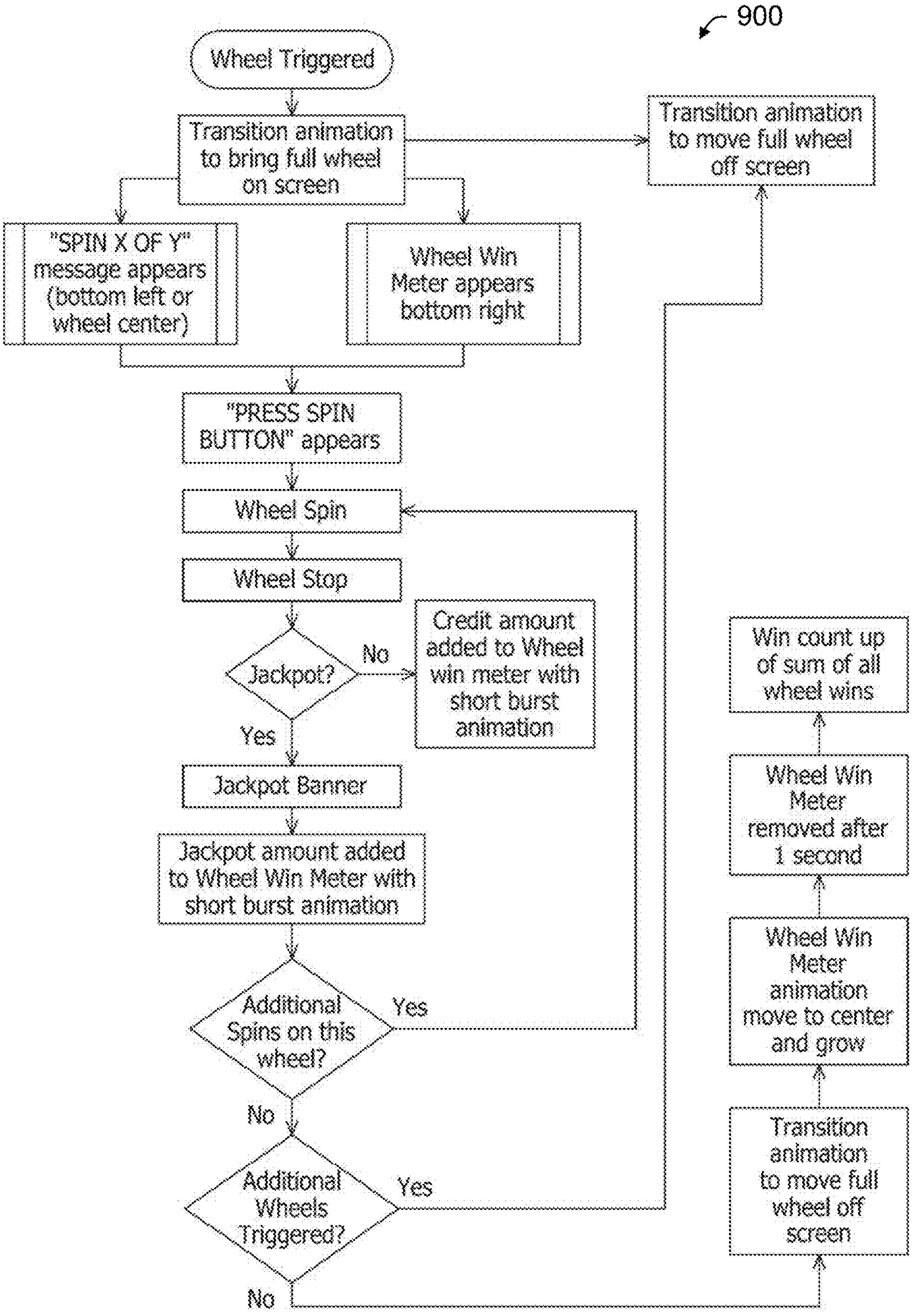
Figure 23A:
Figure 23B:
Figure 23C:
Figure 23D:

For example, referring to FIG. 9, in method step 402, the game control unit 22 displays the game screen 74 on the display unit 24 and receives a signal indicating from the operation unit 32 indicating a wager being placed on the game by the player. The game control unit 22 then operates each prize wheel 110 in one of an active prize wheel mode and an inactive prize wheel mode based on the wager amount value of the received wager. For example, as shown in FIG. 3C, the game control unit 22 detects a player's selection of one of the plurality of wager selection buttons 118 displayed on the operation unit 32, operates each prize wheel 110 in the active prize wheel mode or inactive prize wheel mode, and modifies each bonus game symbol 106 to be displayed in the active mode 126 or inactive mode 128 to indicate the current status of each corresponding prize wheel 110. In one embodiment, upon detecting the player's selection of one of the plurality of wager selection buttons 118, the game control unit 22 may be programmed to access a prize wheel logic table 140 being stored in the memory device. The prize wheel logic table 140 includes a plurality of logic cells that includes a mode status indicator 142 associated with a prize wheel and a wager amount. Each mode status indicator 142 indicates whether the corresponding prize wheel 110 is operated in the active prize wheel mode ("ACTIVE") or operated in the inactive prize wheel mode ("INACTIVE") based on the wager amount associated with the player selected wager selection buttons 118. Upon accessing the prize wheel logic table 140, the game control unit 22 determines the mode status indicator 142 for each prize wheel associated with the wager amount associated with the player selected wager selection buttons 118, and operates each prize wheel 110 based on the corresponding mode status indicator 142.

In method step 404, the game control unit 22 is programmed to acquire random numbers from the random number generator 216 for use in executing the primary game 68 and triggering any bonus games 108 and/or bonus feature events 70, 72.

In method step 406, the game control unit 22 is programmed to populate a subset of the cells within each column 80 with a plurality of awards 90. For example, the game control unit 22 displays each column 80 with the first subset of cells 94 including the plurality of prize cells 88 configured to display the awards 90 and the second subset of cells 96 including one or more non-prize cells 92 that do not display an award. The plurality of non-prize cells 92 are arranged in adjacent stacks of non-prize cells 92 positioned near the bottom end 82 of the column 80 and the prize cells 88 are arranged in adjacent stacks of prize cells 88 positioned between the stack of non-prize cells 92 and the top end 84 of the column 80. In one embodiment, the game control unit 22 is programmed to access an award selection weigh table 144 (shown in FIG. 18) which includes a plurality of awards 90 and a plurality of corresponding selection weights. The game control unit 22 randomly selects an award 90 for each prize cell 88 using random numbers acquired by from the random number generator 216 and the selection weights included in the award selection weigh table 144, and populates each prize cell 88 with the corresponding randomly selected award 90. In other embodiments, the prize cells 88 may be populated using one or more predefined award schedules that includes predefined awards associated with each prize cell 88.

In method step 408, the game control unit 22 randomly determines whether the multiplier feature event 130 (shown in FIGS. 24A-24C) has been triggered. If the multiplier feature event 130 has not been triggered, the game control unit 22 proceeds to method step 412. If the multiplier feature event 130 has been triggered, the game control unit 22 executes method step 410 to initiate the multiplier feature event 130. In method step 410, the game control unit 22 selects a multiplier value 132 associated with at least one of the columns 80 modifies each award 90 being displayed in the selected column 80 based on the selected multiplier value 132. For example, in one embodiment, the game control unit 22 may be programmed to access a multiplier selection weight table 146 (shown in FIG. 20) being stored in memory device that includes a plurality of multiplier values 132 associated with each column 80 and corresponding selection weights. The game control unit 22 randomly selects a multiplier value 132 for each column 80 using random numbers acquired by from the random number generator 216 and the selection weights included in the multiplier selection weight table 146. Referring to FIGS. 24A-24C, the game control unit 22 is programmed to display the multiplier feature event 130 by displaying each selected multiplier value 132 with each associated column 80, animate each multiplier value 132 to move from the bottom end 82 of each column 80 towards the top end 84 of each column 80, and modify each award 90 to increase the value of each award 90 based on the corresponding multiplier value 132 as the multiplier values 132 pass over the awards 90. In addition, game control unit 22 also modifies each bonus game symbol 106 to display a number of spins equal to the corresponding multiplier values 132. In addition, the game control unit 22 may be programmed to execute the algorithm illustrated in method 600 to display the multiplier feature event 130. Upon completion of the multiplier feature event 130, the game control unit 22 proceeds to method step 412.

In method step 412, the game control unit 22 randomly determines, for each corresponding column 80, a number of corresponding symbols 86 to be displayed in a stack of corresponding symbols 86. For example, in one embodiment, the game control unit 22 may be programmed to access a game symbol selection weight table 148 (shown in FIG. 19) being stored in memory device that includes a plurality of selection weights associated with each column 80. Each selection weight is also associated with a number of game symbols 86 that may be displayed within each column 80. The game control unit 22 randomly selects a number of game symbols 86 to be displayed in each column 80 using random numbers acquired by from the random number generator 216 and the selection weights included in the game symbol selection weight table 148.

In method step 414 the game control unit 22 displays each stack of corresponding symbols 86 within each corresponding column 80. For example, referring to FIGS. 23A-23D, in the illustrated embodiment, using a game symbol image data file 150 (shown in FIG. 15) stored in the memory device, the game control unit 22 is programmed to display each stack of corresponding symbols 86 within each corresponding column 80 by animating each stack of corresponding symbols 86 to appear at the bottom end 82 of each corresponding column 80 and increase in height towards the top end 84 of each In method step 416, prior to providing an award to the player, the game control unit 22 randomly determines whether display of the virtual bonus feature selection reel 134 has been triggered. If the display of the virtual bonus feature selection reel 134 has not been triggered, the game control unit 22 proceeds to method step 436. If the display of the virtual bonus feature selection reel 134 has been triggered, the game control unit 22 proceeds to method step 418 to display the virtual bonus feature selection reel 134 in the bonus feature display area 64*c*. For example, in one embodiment, the game control unit 22 accesses the game symbol image data file 150 (shown in FIG. 15) and the bonus feature reel strip 136 (shown in FIG. 21) to generate and display the virtual bonus feature selection reel 134. The virtual bonus feature selection reel 134 displays the plurality of bonus feature symbols 138 including the "Bonus Feature A" symbol associated with the first bonus feature event 70 (shown in FIGS. 26A-26D), the "Bonus Feature B" symbol associated with the second bonus feature event 72 (shown in FIGS. 27A-27D), and the "Bonus Feature C" symbol associated with both the first and second bonus feature event 70, 72. The game control unit 22 then accesses a reel stop position data file 152 (shown in FIG. 33) stored in the memory device, which includes a plurality of stop positions and corresponding ranges of random numbers. The game control unit 22 randomly selects a stop position of the virtual bonus feature selection reel 134 using random numbers acquired by from the random number generator 216 and the reel stop position data file 152, and spins and stops virtual bonus feature selection reel 134 based on the randomly selected stop position to display the randomly selected bonus feature symbol 138. If the "Bonus Feature A" symbol has been selected, the game control unit 22 executes method steps 420-426 to initiate the first bonus feature event 70. If the "Bonus Feature B" symbol has been selected, the game control unit 22 executes method steps 428-434 to initiate the second bonus feature event 72. If the "Bonus Feature C" symbol has been selected, the game control unit 22 executes method steps 422-426 and 430-434 to initiate the first and second bonus feature events 70, 72. In addition, the game control unit 22 may be programmed to execute the algorithm illustrated in methods 700 and 800 to display the bonus feature events 70, 72.

In method steps 422 and 424, the game control unit 22 initiates the first bonus feature event 70 by selecting at least one of the plurality of columns 80 to add additional symbols 86, and determining a number of additional symbols to be added to a corresponding stack of corresponding symbols being displayed in the selected at least one column. For example, in one embodiment, the game control unit 22 may be programmed to access an additional symbol selection weight table 154 (shown in FIG. 22) being stored in memory device that includes a plurality of selection weights associated with different numbers of additional symbols 86 and each column 80. The game control unit 22 randomly selects a number of additional symbols 86 for each column 80 using random numbers acquired by from the random number generator 216 and the selection weights included in the additional symbol selection weight table 154. In other embodiments, the game control unit 22 may be programmed to execute the algorithm illustrated in method 700.

In method step 426, the game control unit 22 then increases the number of corresponding symbols being displayed in the corresponding stack of corresponding symbols to include the determined number of additional symbols. For example, as shown in FIGS. 26A-26D, the game control unit 22 may be programmed to animate each additional symbol 86 to appear at a top portion of the game screen 74 and descend along the corresponding column and land on top of the corresponding stack of corresponding symbols.

In method step 430, the game control unit 22 initiates the second bonus feature event 72 by selecting a displayed stack of corresponding symbols 86 having a highest number of corresponding symbols 86. In method step 432, the game control unit 22 determines a number of additional symbols to be added to each of the other displayed stacks of symbols 86 such that the number of corresponding symbols 86 displayed in each of the other displayed stacks is equal to the highest number of corresponding symbols 86 so that each column 80 displays the same number of game symbols 86.

In method step 434, the game control unit 22 then increases the number of corresponding symbols being displayed in each other displayed stack of corresponding symbols to include the determined number of additional symbols. For example, as shown in FIGS. 27A-27D, the game control unit 22 animates each of the other displayed stacks of corresponding symbols 86 to increase in height to match a height of the selected displayed stack of corresponding symbols 86 having the highest number of corresponding symbols 86.

In method steps 436 and 438, after completion of the bonus feature events 70, 72, if initiated, the game control unit 22 then determines each prize cell 88 being displayed with a corresponding symbol 86 and a corresponding award 90, and provides each corresponding award to the player by increasing the credit meter by the corresponding prize amount.

In method step 440, the game control unit 22 determines one or more bonus games 108 have been triggered. For example, as shown in FIGS. 28A-28B, the game control unit 22 provides to the player each bonus game associated with a column having a stack of corresponding symbols including a predefined number of corresponding symbols. For example, the game control unit 22 determines each column 80 that has a stack of corresponding game symbols 86 having a sufficient number of game symbols 86 to reach a full height of the column 80 (e.g. a game symbol being displayed in each cell associated with the column), and initiates method step 442 to display the bonus game 108 including each corresponding prize wheel 110.

In method step 442, the game control unit 22 displays each prize wheel 110 including a plurality of award values. For example, in one embodiment, the game control unit 22 may access a prize wheel award logic table 156 (shown in FIG. 17) being stored in memory device that includes a plurality of award values associated with each prize wheel. The game control unit 22 determines which prize wheel has been triggered, selects the corresponding award values from the prize wheel award logic table 156 and displays a bonus game screen 74 including the prize wheel with the corresponding award values.

In method step 444, the game control unit 22 determines the number of spins associated with the corresponding bonus game, and for each of the number of spins, randomly select an award value, spins and stops the corresponding prize wheel to display the selected award value, and provides the selected award to the player. In one embodiment, the game control unit 22 may select a multiplier value associated with each column, and determine the number of spins associated with each corresponding bonus game based on the associated multiplier values.

Figure 30:
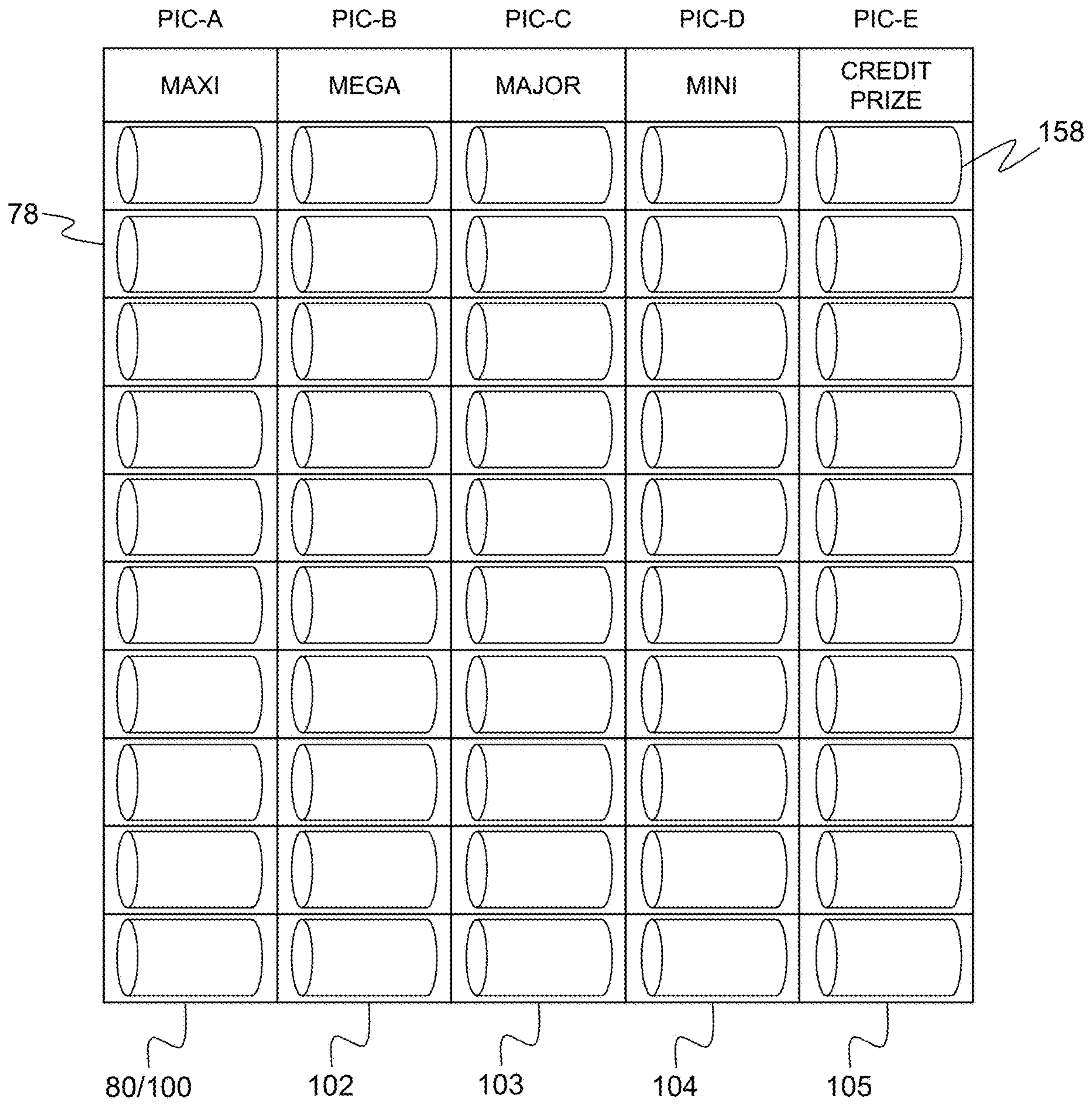
FIG. 30 is another illustration of a game shown in FIGS. 3A-3C, according to an embodiment of the present invention.

Referring to FIGS. 30-32, in one embodiment, the game control unit 22 may be programmed to display the primary game 68 including a plurality of unisymbol reels 158. For example, the game control unit 22 may display a unisymbol reel 158 in each cell 78 of the grid 76. Each unisymbol reel 158 includes a reel strip 160 (shown in FIG. 32) including one or more first symbol positions 162 displaying a corresponding game symbol 86 and one or more second symbol position 164 displaying a blank symbol 166. Each unisymbol reel 158 is associated with a corresponding column 80 and includes a reel strip 160 that displays the same game symbol 86, so that each column 80 is associated with a corresponding game symbol 86. For example, the unisymbol reels 158 displayed in the 1st column 100 include the PIC-A reel strip that includes the PIC-A symbol. Similarly, the unisymbol reels 158 displayed in the 2nd column 102 include the PIC-B reel strip that includes the PIC-B symbol, the unisymbol reels 158 displayed in the 3rd column 103 include the PIC-C reel strip that includes the PIC-C symbol, the unisymbol reels 158 displayed in the 4th column 104 include the PIC-D reel strip that includes the PIC-D symbol, and the unisymbol reels 158 displayed in the 5th column 105 include the PIC-E reel strip that includes the PIC-E symbol.

Figure 31A:
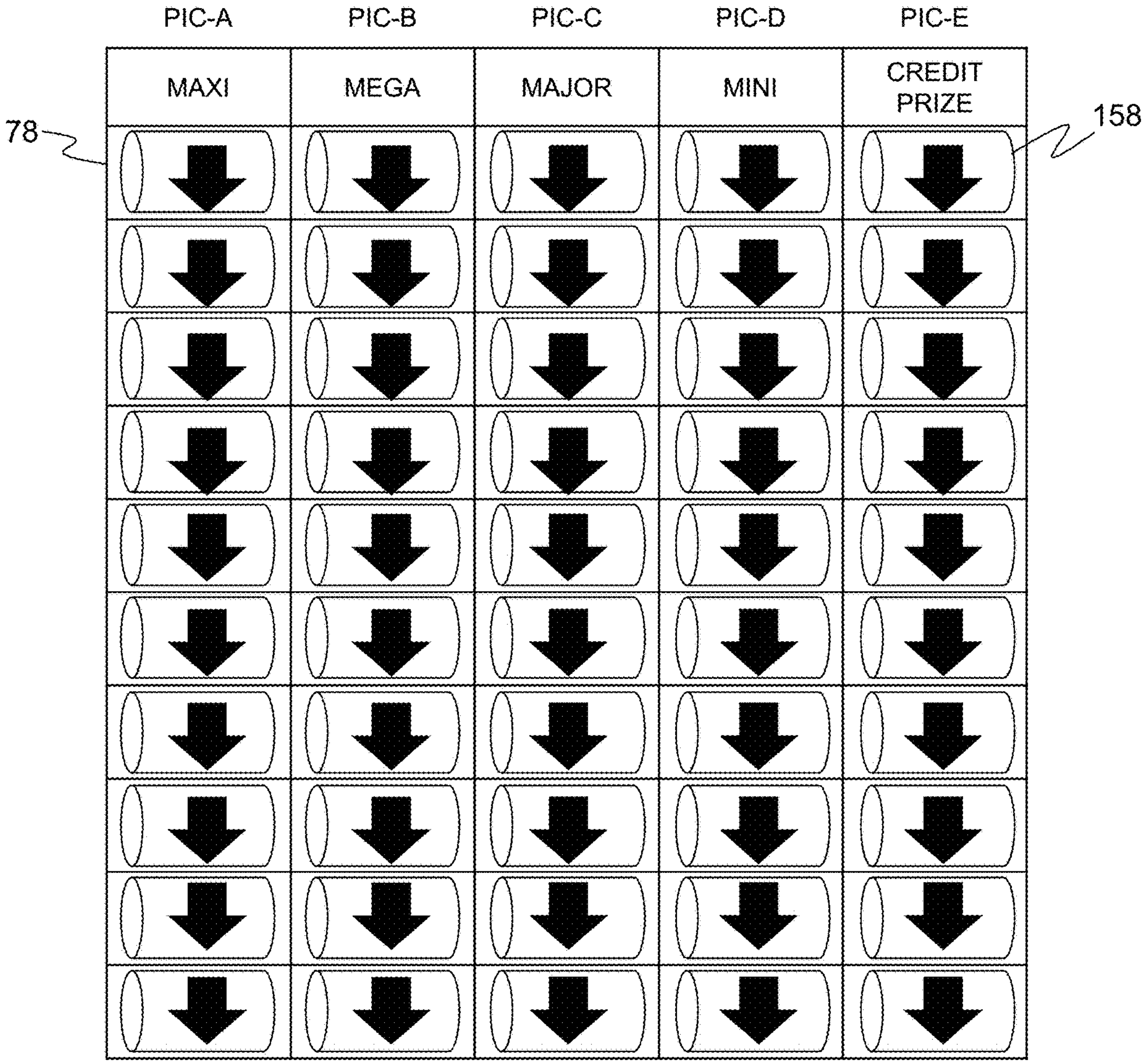
FIGS. 31A-31C are illustrations of sequences of graphic images that may be used to display the game shown in FIG. 30 on the display area of the gaming machine and/or the mobile computer device, according to embodiments of the present invention.
Figure 31B:
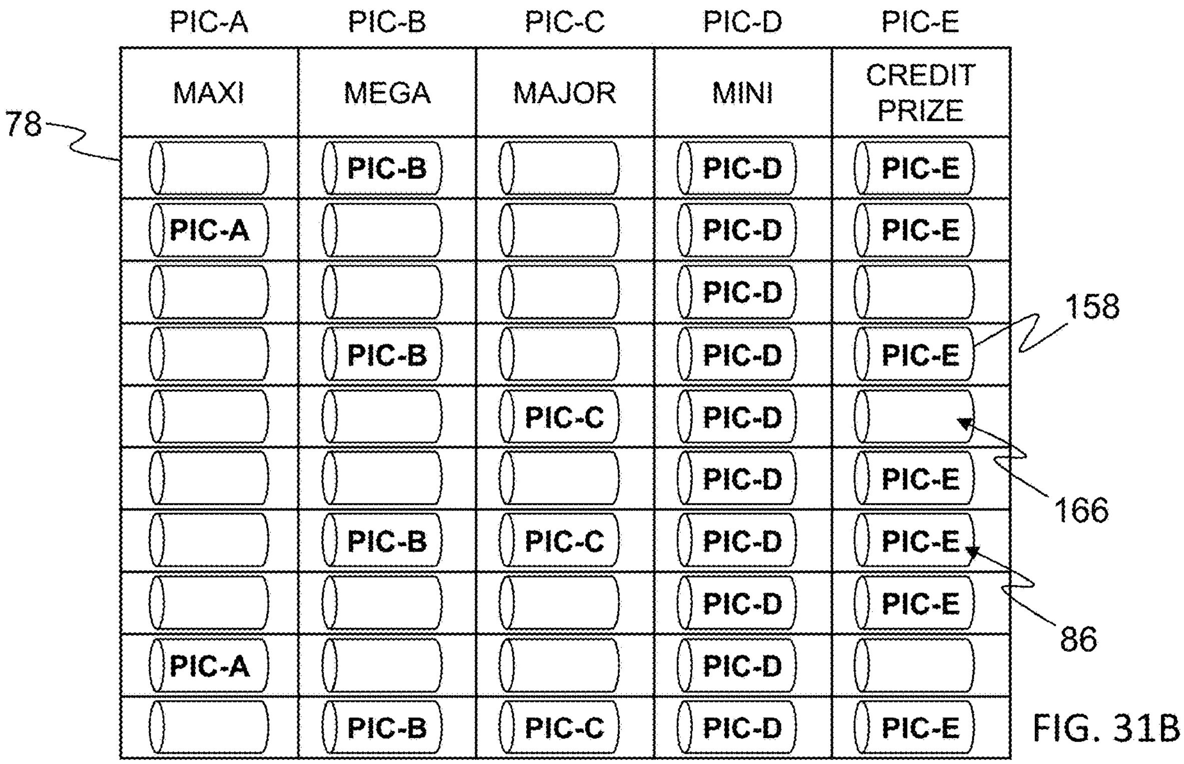
Figure 31C:
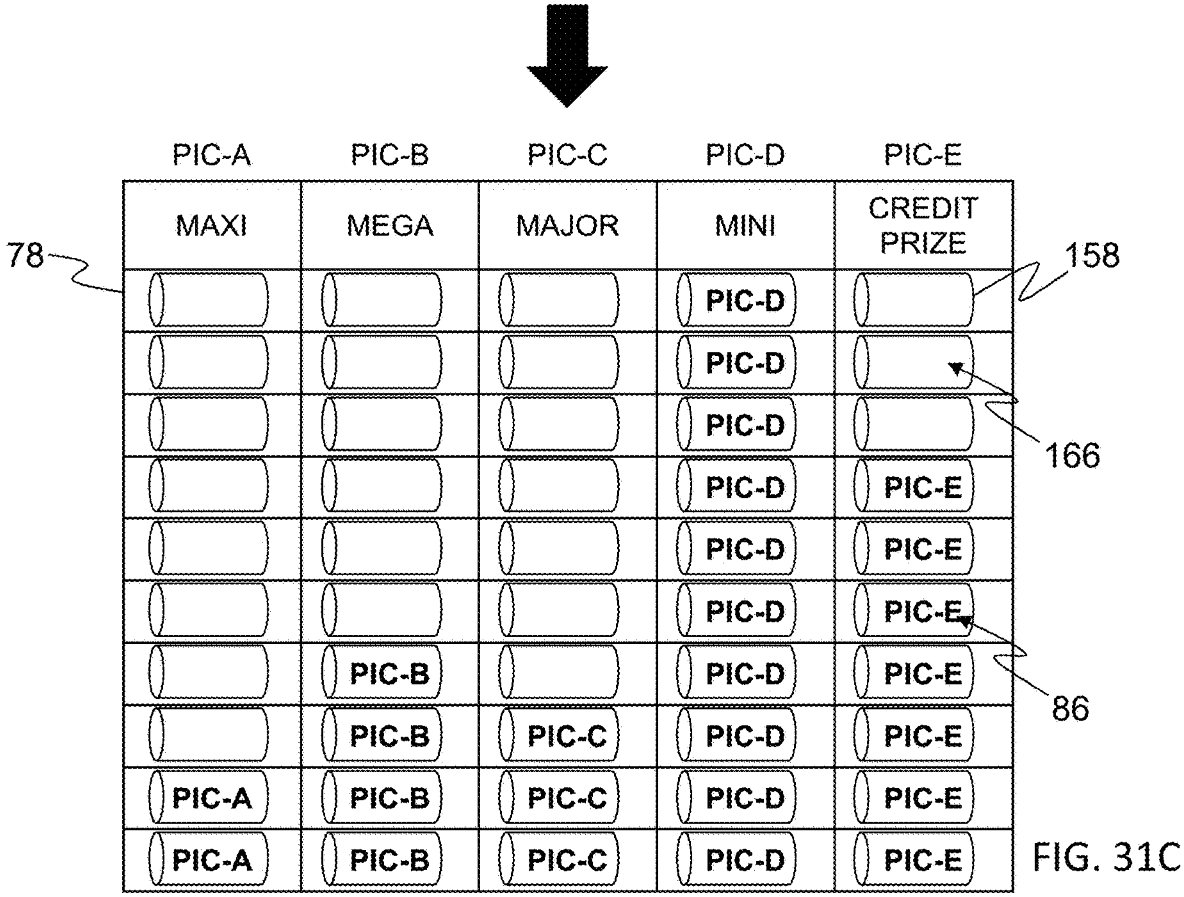

During operation, as shown in FIGS. 31A-31C, the game control unit 22 selects a stop position for each unisymbol reel 158 using random numbers acquired by from the random number generator 216 and the reel stop position data file 152, and spins and stops each unisymbol reel 158. Upon stopping the unisymbol reels 158, the game control unit 22 then determines a number of game symbols 86 being displayed in each column 80, and again spins and stops the unisymbol reels 158 to display the stack of corresponding game symbols 86 in each column 80 with blank symbol 166 displayed in the other cells 78. The game control unit 22 may then determine whether to initiate any bonus feature events 70, 72 and/or bonus games 108 as described above.

It should be noted that in one aspect of the present invention, one or more dynamic virtual reel strips may be utilized. Using dynamic virtual reel strips, the symbols and/or symbol positions and/or sequence of symbol positions and/or length or size and/or any aspect of a virtual reel strip may change from one spin or play to the next. For example, a dynamic virtual reel strip may include variable symbol positions that include instructions to display randomly selected game symbols for each play of the primary game. The variable symbol positions may be in the form of one or more stacks, i.e., adjacent symbol positions. In one embodiment, the location and/or size of the stacks may change from one spin to the next, either randomly and/or in a predetermined pattern. In addition, a virtual reel strip associated with a column of cells may be dynamically changed from one spin or play to another spin or play. This may occur randomly, every spin or play and/or in a predetermined pattern.

Further, in the embodiment, a bill/ticket is displayed as game value, and received by these bill/ticket identification devices, and a form where a ticket is output by a printer device is described, but the present invention is not limited to this. The game value is a concept including tangible objects such as a coin, bill, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a cabinet;

a control panel mounted to the cabinet;

a display device mounted to the cabinet; and a control unit operably coupled to the control panel and the display device, the control unit including a processor programmed to execute an algorithm to display an animated sequence of computer-generated images on the display device including the steps of:

rendering a game screen on the display device including a grid including a plurality of cells arranged in a plurality of columns, each column including a pre-defined number of cells;

animating a corresponding bonus wheel game symbol to appear adjacent a top end of each column;

animating a stack of symbols to appear within each column with a first column including a first stack of symbols having a number of symbols that is less than a number of cells in the first column such that the first stack of symbols does not extend to a full height of the first column; and rendering a prize wheel on the display device upon detecting a second column having a second stack of symbols extending to a full height of the second column.

2. The gaming machine of claim 1, wherein the processor is programmed to execute the algorithm including the steps of:

associating each bonus wheel game symbol with a different prize wheel.

3. The gaming machine of claim 2, wherein the processor is programmed to execute the algorithm including the steps of:

animating a first bonus wheel game symbol associated with a first prize wheel including credit awards and a second bonus wheel game symbol associated with a second prize wheel including credit awards and a progressive award.

4. The gaming machine of claim 1, wherein the processor is programmed to execute the algorithm including the steps of:

animating each bonus wheel game symbol in one of an inactive mode and an active mode.

5. The gaming machine of claim 4, wherein the processor is programmed to execute the algorithm including the steps of:

rendering a plurality of player selectable buttons on the control panel, each player selectable button associated with a different group of bonus wheel game symbols.

6. The gaming machine of claim 5, wherein the processor is programmed to execute the algorithm including the steps of:

animating a corresponding group of bonus wheel game symbols from the inactive mode to the active mode upon detecting a player selection of a corresponding player selectable button.

7. The gaming machine of claim 6, wherein the processor is programmed to execute the algorithm including the steps of:

rendering the prize wheel on the display device upon detecting the second column having a stack of symbols extending to the full height of the second column and the corresponding bonus wheel game symbol displayed in the active mode.

8. A method of operating a gaming machine including a cabinet, a control panel mounted to the cabinet, a display device mounted to the cabinet, and a processor operably coupled to the control panel and the display device, the method including the processor performing an algorithm to display an animated sequence of computer-generated images on the display device including the steps of:

rendering a game screen on the display device including a grid including a plurality of cells arranged in a plurality of columns, each column including a pre-defined number of cells;

animating a corresponding bonus wheel game symbol to appear adjacent a top end of each column;

animating a stack of symbols to appear within each column with a first column including a first stack of symbols having a number of symbols that is less than a number of cells in the first column such that the first stack of symbols does not extend to a full height of the first column; and rendering a prize wheel on the display device upon detecting a second column having a second stack of symbols extending to a full height of the second column.

9. The method of claim 8, including the processor performing the algorithm including the steps of:

associating each bonus wheel game symbol with a different prize wheel.

10. The method of claim 9, including the processor performing the algorithm including the steps of:

animating a first bonus wheel game symbol associated with a first prize wheel including credit awards and a second bonus wheel game symbol associated with a second prize wheel including credit awards and a progressive award.

11. The method of claim 8, including the processor performing the algorithm including the steps of:

animating each bonus wheel game symbol in one of an inactive mode and an active mode.

12. The method of claim 11, including the processor performing the algorithm including the steps of:

rendering a plurality of player selectable buttons on the control panel, each player selectable button associated with a different group of bonus wheel game symbols.

13. The method of claim 12, including the processor performing the algorithm including the steps of:

animating a corresponding group of bonus wheel game symbols from the inactive mode to the active mode upon detecting a player selection of a corresponding player selectable button.

14. The method of claim 13, including the processor performing the algorithm including the steps of:

rendering the prize wheel on the display device upon detecting the second column having a stack of symbols extending to the full height of the second column and the corresponding bonus wheel game symbol displayed in the active mode.

15. A non-transitory computer-readable storage media having computer-executable instructions embodied thereon to operate a gaming machine including a cabinet, a control panel mounted to the cabinet, a display device mounted to the cabinet, and a processor operably coupled to the control panel and the display device, when executed by the processor the computer-executable instructions cause the processor to perform an algorithm to display an animated sequence of computer-generated images on the display device including the steps of:

rendering a game screen on the display device including a grid including a plurality of cells arranged in a plurality of columns, each column including a predefined number of cells;

animating a corresponding bonus wheel game symbol to appear adjacent a top end of each column;

animating a stack of symbols to appear within each column with a first column including a first stack of symbols having a number of symbols that is less than a number of cells in the first column such that the first stack of symbols does not extend to a full height of the first column; and rendering a prize wheel on the display device upon detecting a second column having a second stack of symbols extending to a full height of the second column.

16. The non-transitory computer-readable storage media of claim 15, wherein the computer-executable instructions cause the processor to perform the algorithm including the steps of:

associating each bonus wheel game symbol with a different prize wheel.

17. The non-transitory computer-readable storage media of claim 16, wherein the computer-executable instructions cause the processor to perform the algorithm including the steps of:

animating a first bonus wheel game symbol associated with a first prize wheel including credit awards and a second bonus wheel game symbol associated with a second prize wheel including credit awards and a progressive award.

18. The non-transitory computer-readable storage media of claim 15, wherein the computer-executable instructions cause the processor to perform the algorithm including the steps of:

animating each bonus wheel game symbol in one of an inactive mode and an active mode.

19. The non-transitory computer-readable storage media of claim 18, wherein the computer-executable instructions cause the processor to perform the algorithm including the steps of:

rendering a plurality of player selectable buttons on the control panel, each player selectable button associated with a different group of bonus wheel game symbols.

20. The non-transitory computer-readable storage media of claim 19, wherein the computer-executable instructions cause the processor to perform the algorithm including the steps of:

animating a corresponding group of bonus wheel game symbols from the inactive mode to the active mode upon detecting a player selection of a corresponding player selectable button; and rendering the prize wheel on the display device upon detecting the second column having a second stack of symbols extending to the full height of the second column and the corresponding bonus wheel game symbol displayed in the active mode.

* * * * *